US009843985B2

(12) United States Patent
Mainaud et al.

(10) Patent No.: US 9,843,985 B2
(45) Date of Patent: *Dec. 12, 2017

(54) MULTI-MEDIA MULTI-MODULATION AND MULTI-DATA RATE MESH NETWORK

(71) Applicant: Itron Global SARL, Liberty Lake, WA (US)

(72) Inventors: Bastien Mainaud, Ris-Orangis (FR); Viet-Hung Nguyen, Saint-Mande (FR); Hartman Van Wyk, Montlouis sur Loire (FR); John Buffington, Hauser, ID (US)

(73) Assignee: ITRON GLOBAL SARL, Liberty Lake, WA (US)

( * ) Notice: Subject to any disclaimer, the term of this patent is extended or adjusted under 35 U.S.C. 154(b) by 281 days.

This patent is subject to a terminal disclaimer.

(21) Appl. No.: 14/634,696

(22) Filed: Feb. 27, 2015

(65) Prior Publication Data

US 2015/0181500 A1 Jun. 25, 2015

Related U.S. Application Data

(63) Continuation of application No. 13/648,095, filed on Oct. 9, 2012, now Pat. No. 8,971,200.

(30) Foreign Application Priority Data

Aug. 6, 2012 (EP) ..................................... 12179445

(51) Int. Cl.
*H04W 40/12* (2009.01)
*H04B 3/46* (2015.01)
(Continued)

(52) U.S. Cl.
CPC .............. *H04W 40/12* (2013.01); *H04B 3/46* (2013.01); *H04L 43/08* (2013.01);
(Continued)

(58) Field of Classification Search
CPC .......... H04B 3/46; H04W 24/00; H04L 12/26; H04L 12/2668; H04L 12/2671;
(Continued)

(56) References Cited

U.S. PATENT DOCUMENTS 5,416,779 A 5/1995 Barnes et al.
6,810,428 B1 10/2004 Larsen et al.
(Continued)

FOREIGN PATENT DOCUMENTS

GB 2455794 6/2009
JP 10507852 A 7/1998
(Continued)

OTHER PUBLICATIONS

Japanese Office Action, with English translation, dated Dec. 15, 2015, for Japanese Patent Application No. 2014-541033, 8 pages.
(Continued)

*Primary Examiner* — Jung-Jen Liu

(57) ABSTRACT

A node having a multiple protocol receiver may listen to multiple links in parallel and determine a quality of links having multiple communication technologies between the node and multiple neighbor nodes. The multiple communication technologies may include radio frequency (RF) communication technologies and one or more power line communication (PLC) communication technologies. The node determines a link quality metric for each link associated with an optimum communication technology and data rate, and maintains availability information of neighbor nodes. The node may then route communications to neighbor nodes using the link quality metric and the availability information.

20 Claims, 8 Drawing Sheets

(51) Int. Cl.
  *H04L 12/26* (2006.01)
  *H04W 36/26* (2009.01)
  *H04W 84/18* (2009.01)

(52) U.S. Cl.
  CPC ......... *H04L 43/0823* (2013.01); *H04W 36/26* (2013.01); *H04W 84/18* (2013.01); *Y02B 60/50* (2013.01)

(58) Field of Classification Search
  CPC ............. H04L 12/2673; H04L 43/0876; H04L 43/0882; H04L 43/0888; H04L 67/2828
  See application file for complete search history.

(56) References Cited

U.S. PATENT DOCUMENTS

| | | |
|---|---|---|
| 6,914,950 B1 | 7/2005 | Luneau |
| 6,985,714 B2 | 1/2006 | Akiyama et al. |
| 7,583,197 B2 | 9/2009 | Wesby Van Swaay |
| 7,924,764 B2 | 4/2011 | Moorti et al. |
| 7,948,891 B2 | 5/2011 | Takeda et al. |
| 8,094,010 B2 | 1/2012 | Wesby-van Swaay |
| 8,130,657 B2 | 3/2012 | Mosko |
| 8,130,700 B2 | 3/2012 | Flammer et al. |
| 2002/0180615 A1 | 12/2002 | Kim et al. |
| 2003/0058886 A1 | 3/2003 | Stanforth et al. |
| 2004/0203474 A1 | 10/2004 | Miller et al. |
| 2004/0246935 A1 | 12/2004 | Joshi et al. |
| 2005/0002364 A1 | 1/2005 | Ozer et al. |
| 2005/0058151 A1 | 3/2005 | Yeh |
| 2005/0073992 A1 | 4/2005 | Lee et al. |
| 2005/0078631 A1 | 4/2005 | Cornwall |
| 2005/0089005 A1 | 4/2005 | Sakoda et al. |
| 2005/0099964 A1 | 5/2005 | Delaney et al. |
| 2005/0111428 A1 | 5/2005 | Orlik et al. |
| 2005/0185632 A1 | 8/2005 | Draves, Jr. et al. |
| 2005/0207367 A1 | 9/2005 | Onggosanusi et al. |
| 2005/0213602 A1 | 9/2005 | Redi |
| 2006/0034233 A1 | 2/2006 | Strutt et al. |
| 2006/0045004 A1 | 3/2006 | Charzinski et al. |
| 2006/0077909 A1 | 4/2006 | Saleh et al. |
| 2006/0215577 A1 | 9/2006 | Guichard et al. |
| 2006/0215583 A1 | 9/2006 | Castagnoli |
| 2006/0215605 A1 | 9/2006 | Srikrishna et al. |
| 2006/0256737 A1 | 11/2006 | Choi et al. |
| 2007/0189182 A1* | 8/2007 | Berkman ................ H04B 3/54 370/252 |
| 2007/0291660 A1 | 12/2007 | Robson et al. |
| 2008/0069034 A1 | 3/2008 | Buddhikot et al. |
| 2008/0089390 A1 | 4/2008 | Picard |
| 2008/0151821 A1 | 6/2008 | Cho et al. |
| 2008/0170544 A1 | 7/2008 | Tang et al. |
| 2008/0171552 A1 | 7/2008 | Hyon et al. |
| 2008/0298450 A1 | 12/2008 | Zhang et al. |
| 2009/0003232 A1 | 1/2009 | Vaswani et al. |
| 2009/0003356 A1 | 1/2009 | Vaswani et al. |
| 2009/0080394 A1 | 3/2009 | Ishii |
| 2009/0086664 A1 | 4/2009 | Wu |
| 2009/0267792 A1 | 10/2009 | Crichlow |
| 2010/0284334 A1 | 11/2010 | Shin et al. |
| 2010/0290610 A1 | 11/2010 | Gore |
| 2011/0019759 A1* | 1/2011 | Stager ................ H04B 7/0413 375/267 |
| 2011/0110351 A1 | 5/2011 | Seok |
| 2011/0182326 A1 | 7/2011 | Picard |
| 2011/0206087 A1 | 8/2011 | Picard |
| 2013/0031253 A1* | 1/2013 | Hui ...................... H04L 43/0811 709/225 |
| 2013/0051250 A1 | 2/2013 | Shaffer et al. |
| 2013/0159479 A1* | 6/2013 | Vasseur ................ H04L 47/10 709/221 |
| 2013/0215942 A1* | 8/2013 | Addepalli ............. H04L 27/345 375/224 |
| 2014/0029624 A1* | 1/2014 | Vasseur ................ H04W 40/28 370/401 |
| 2014/0036702 A1 | 2/2014 | Van Wyk et al. |

FOREIGN PATENT DOCUMENTS

| | | |
|---|---|---|
| JP | 2002507343 | 3/2002 |
| JP | 2003229790 A | 8/2003 |
| JP | 2005039722 A | 2/2005 |
| JP | 2005341231 A | 12/2005 |
| JP | 2006279660 A | 10/2006 |
| JP | 2006311495 A | 11/2006 |
| JP | 2008-205929 A | 9/2008 |
| JP | 2009-077119 A | 4/2009 |
| JP | 2009130517 A | 6/2009 |
| JP | 2009225444 | 10/2009 |
| JP | 2010-530175 A | 9/2010 |
| JP | 2012004891 A | 1/2012 |
| WO | WO2004109474 A2 | 12/2004 |
| WO | WO2008044554 | 4/2008 |
| WO | WO2008105771 | 9/2008 |
| WO | 2008156544 A2 | 12/2008 |

OTHER PUBLICATIONS

Lee, et al., "EGTS Subgroup Report for IEEE 802.15.4e," slides, IEEE 802.15-09-0183-02-004e, Jul. 14, 2009, 24 pages.

Office Action for U.S. Appl. No. 13/364,834, dated Jul. 25, 2014, 33 pages.

Japanese Notice of Allowance, with English translation, dated Apr. 19, 2016, for Japanese Patent Application No. 2014-541033, 6 pages.

Notice of Acceptance for Australian Patent Appl. No. 2012387182, dated May 20, 2016, 2 pages.

The Australian Office Action dated Aug. 21, 2015 for Australian Patent Application No. 2012387182, a counterpart foreign application of U.S. Appl. No. 13/648,095, 2 pages.

Canadian Office Action dated Nov. 15, 2016, for Canadian Patent Application No. 2,854,636; 5 pages.

Canadian Office Action dated Nov. 18, 2016, for Canadian Patent Application No. 2,854,599, 3 pages.

Canadian Office Action dated Dec. 21, 2016, for Canadian Patent Application No. 2,881,486, 3 pages.

Ahn et al., "Robust Multi-Channel Adaptaion for Smart Utility Networks", IEEE P802.15 Working Group for Wireless Personal Area Networks (WPAN's) May 8, 2009, pp. 1-pp. 49.

The Australian Office Action dated Dec. 5, 2014 for Australian patent application No. 2012336326, a counterpart foreign application of U.S. Appl. No. 13/364,044, 3 pages.

The Australian Office Action dated Feb. 27, 2015 for Australian patent application No. 2012336328, a counterpart foreign application of U.S. Appl. No. 13/364,834, 5 pages.

Benveniste, "CCC MMAC Protocol Framework and Optional Features", IEEE 802.11-05/0880r1, IEEE mentor, Nov. 11, 2005.

Chang et al., "Frequency Hopping Support in TG4g", IEEE P802. 15-0258-10-01-004g, IEEE P802.15 Working Group for Wireless Personal Area Networks (WPAN's), Jun 24, 2010, pp. 1-pp. 6.

De Couto, et al., "A High-Throughput Path Metric for Mutt-Hop Wireless Routing", Proceedings of the Ninth Annual International Conference on Mobile Computing and Networking (MOBICOM 2003), San Diego, CA, USA, vol. Conf. 9, Sep. 14, 2003, pp. 134-146.

Draves et al., "Routing in Multi-Radio, Multi-Hop Wireless Mesh Nteworks", MobiCom '04, Sep. 26-Oct. 1, 2004, Philadelphia, Pennsylvania, ACM 2004, pp. 114-pp. 128.

Emmelmann, "AP and Network Discovery Enhancements", IEEE 802.11-11/1521r1, IEEE mentor, Nov. 9, 2011.

The European Office Action dated Nov. 28, 2013 for European patent application No. 11188904.4, a counterpart foreign application of U.S. Appl. No. 13/364,044, 4 pages.

The Extended European Search Report dated Jan. 20, 2012 for European patent application No. 11188904.4, 7 pages.

(56) References Cited

OTHER PUBLICATIONS

The Extended European Search Report dated Jan. 27, 2012 for European patent application No. 11188905.1, 9 pages.
The Extended European Search Report dated Oct. 12, 2012 for European patent application No. 12179445.7, 5 pages.
Freaklabs—Open Source Wireless, IEEE 802.15.4 in the context of Zigbee—Part 2, Dec. 14, 2008, 8 pages.
IEEE, "IEEE Standard for Local and Metropolitan Area Networks Part 15.4: Low Rate Wireless Personal Area Networks", Amendment to the MAC Sublayer, IEEE Computer Socierty, Oct. 2011, pp. 1-pp. 205.
Jain, et all, "A multichannel CSMA MAC protocol with receiver-based channel selection for multihop wireless networks", Proceedings of the 10th International Conference on Computer Communications and Networks, 2001, pp. 432-439.
The Japanese Office Action dated Nov. 12, 2013 for Japanese patent application No. 2013-543423, a counterpart foreign application of U.S. Appl. No. 13/364,834, 9 pages.
The Japanese Office Action dated Mar. 11, 2014 for Japanese patent application No. 2013-543423, a counterpart foreign application of U.S. Appl. No. 13/364,834, 8 pages.
Jungmin, et al, "Multi-Channel MAC for Ad Hoc Networks: Handling Multi-Channel Hidden Terminals Using a Single Transceiver", MOBIHOC 2004, Proceedings of the 5th ACM International Symposium on Mobile Ad Hoc Networking and Computing, Tokyo, JP, May 24-26, 2004, pp. 222-233.
Kojima, et al., "MAC Proposals for Low-Power Consumption", IEEE 802.15-09-0514-00-004e, IEEE mentor, Jul. 13, 2009.
Kopmeiners, et al. "A Standardized and Flexible IPv6 Architecture for Field Area Networks" Dec. 9, 2011, 22 pages.
Lee, et al, "EGTS Subgroup Report for IEEE 802.15.4e", IEEE 802.15-09-0666-01-004e, IEEE mentor, Sep. 22, 2009.
Lee, et al., "Required Changes for EGTS Extension", IEEE-15-09-0377-08-004e, IEEE mentor, Sep. 1, 2009.
Office action for U.S. Appl. No. 13/364,044, dated Feb. 28, 2014, Nguyen et al., "Routing Communications Based on Node Availability", 18 pages.
Non-Final Office Action for U.S. Appl. No. 13/364,834, dated Mar. 25, 2013, Bastien Mainaud et al., "Routing Communications Based on Link Quality", 28 pages.
Office Action for U.S. Appl. No. 13/648,095, dated Jun. 25, 2014, Hartman Van Wyk, "Multi-media multi-modulation method and multi-data rate mesh network", 37 pages.
Final Office Action for U.S. Appl. No. 13/364,044, dated Jun. 27, 2014, Viet-Hung Nguyen, "Routing Communications Based on Node Availability", 18 pages.
Office action for U.S. Appl. No. 13/364,044, dated Sep. 26, 2013, Nguyen et al., "Routing Communications Based on Node Availability", 16 pages.
Office action for U.S. Appl. No. 13/364,834, dated Sep. 6, 2013, Mainaud et al., "Routing Communications Based on Link Quality", 35 pages.
The PCT Search Report dated Oct. 25, 2012 for PCT application No. PCT/US12/23090, 9 pages.
The PCT Search Report dated Nov. 1, 2012 for PCT application No. PCT/US12/23115, 8 pages.
The PCT Search Report dated Feb. 26, 2013 for PCT application No. PCT/US12/59389, 11 pages.
Rolfe, "Simplified Channel hopping for non-beacon PAN", IEEE P802.15 WOrking Group for Wireless Personal Area Networks (WPAN's) May 12, 2010, pp. 1-pp. 5.
Wireless Medium Access Control, IEEE 802.15.4, Speaker Chun-Yi Chen, Sep. 7, 2007, 40 pages.
Wu, et al., "A New Multi-Channel MAC Protocol with On-Demand Channel Assignment for Multi-Hop Mobile Ad Hoc Networks", Proceedings of the International Symposium on Parallel Architectures, Algorithms and Networks, Dec. 7, 2000, pp. 232-237.
Australian Notice of Acceptance mailed Apr. 29, 2015, Australian Patent Application No. 2012336326, 2 pages.
Australian Notice of Acceptance mailed Jun. 19, 2015, Australian Patent Application No. 2012336328, 2 pages.
Communication Pursuant to Article 94(3) EPC for European Patent Application No. 11188904.4 dated Jun. 17, 2016, 5 pages.
Final Office Action for U.S. Appl. No. 13/364,834 dated Nov. 12, 2014, 39 pages.
Japanese Office Action, with English translation, dated Jun. 7, 2016 for Japanese Patent Application No. 2015-526512, 7 pages.
Notice of Allowance for U.S. Appl. No. 13/364,044 dated Jan. 7, 2015, 8 pages.
Japanese Notice of Allowance dated Mar. 7, 2017, for Japanese Patent Application No. 2015-526512, with English translation, 6 pages.
Japanese Notice of Allowance dated Sep. 2, 2014, for Japanese Patent Application No. 2013-543423, with English translation, 8 pages.
Canadian Office Action dated Jun. 5, 2017, for Canadian Patent Application No. 2,854,599, 4 pages.
Canadian Office Action dated Oct. 13, 2017, for Canadian Patent Application No. 2,854,636; 3 pages.

* cited by examiner

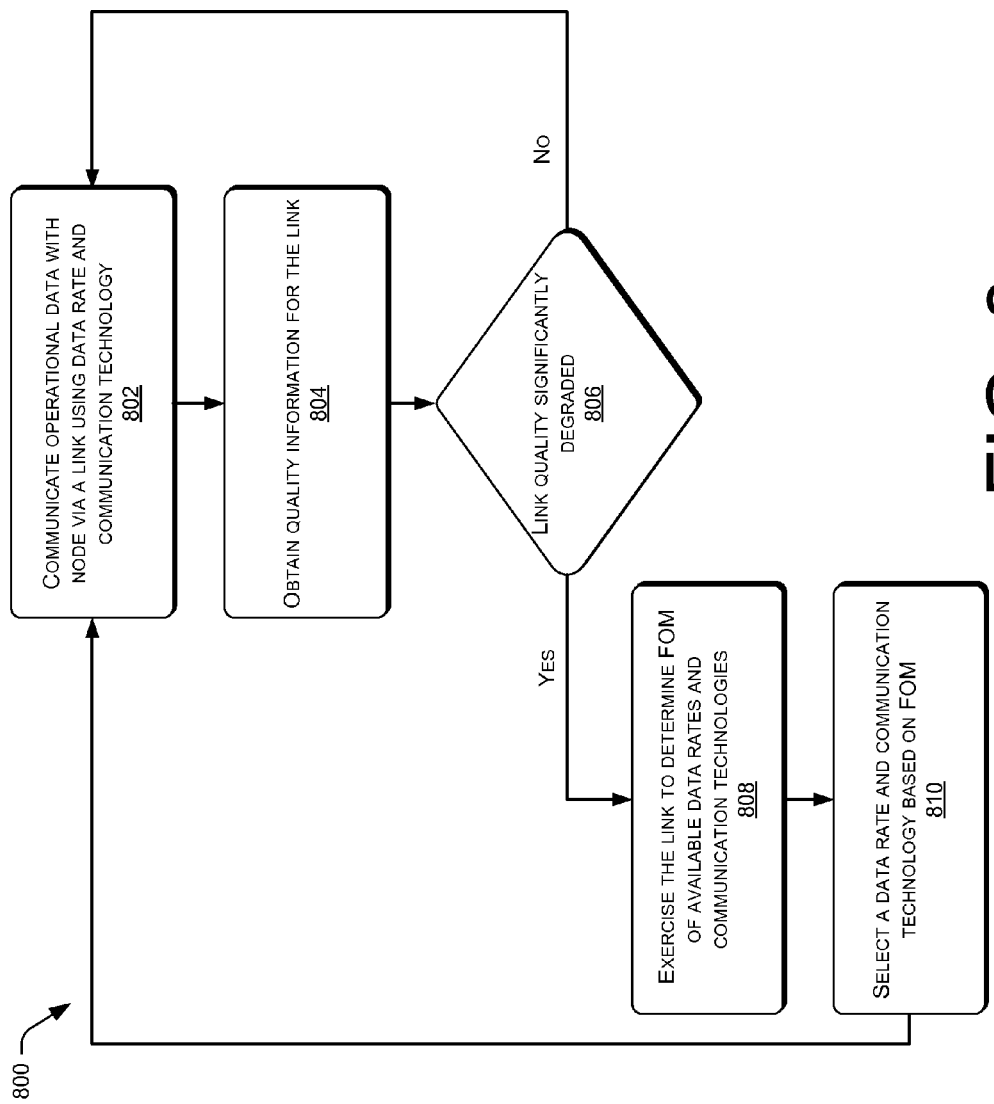

MULTI-MEDIA MULTI-MODULATION AND MULTI-DATA RATE MESH NETWORK

RELATED APPLICATIONS

This application is a continuation of, and claims priority to, U.S. application Ser. No. 13/648,095, filed on Oct. 9, 2012, which claims priority to European Application No. 12179445.7, filed on Aug. 6, 2012, both of which are incorporated herein by reference.

BACKGROUND

Communication networks, such as mesh networks, are used to connect a variety of different devices. For example, mesh networks have been employed in the utility industry to connect utility meters, cellular relays, transformers, and/or other nodes. The nodes in the mesh network are typically able to receive data from neighboring nodes and to relay or propagate messages to other neighbor nodes.

In traditional wired networks, routing metrics may be used which route messages based on a fewest number of hops between a source and a destination. In a mesh network, however, a data rate between nodes may vary substantially from one link to another. This variation in data rate may be due, at least in part, to the fact that mesh networks often contain multiple different generations of nodes having different characteristics and capabilities. For example, different generations of nodes may employ or be capable of employing different communication medias, different modulation techniques and operate at different or variable data rates. This may be particularly true for utility mesh networks in which nodes are placed into service gradually over time and are expected to remain in the field for relatively long life cycles (e.g., 20 years or more). Generally, newer generations of nodes are capable of additional modulations and higher data rates than older generations of nodes. Therefore, as newer generations or various models of nodes are deployed with the mesh network, there may be incompatibility issues that prevent some nodes from communicating with each other.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 8 is a flowchart illustrating an example method of determining a degradation of a link during transmission of operational data.

DETAILED DESCRIPTION

Overview

Figure 1:
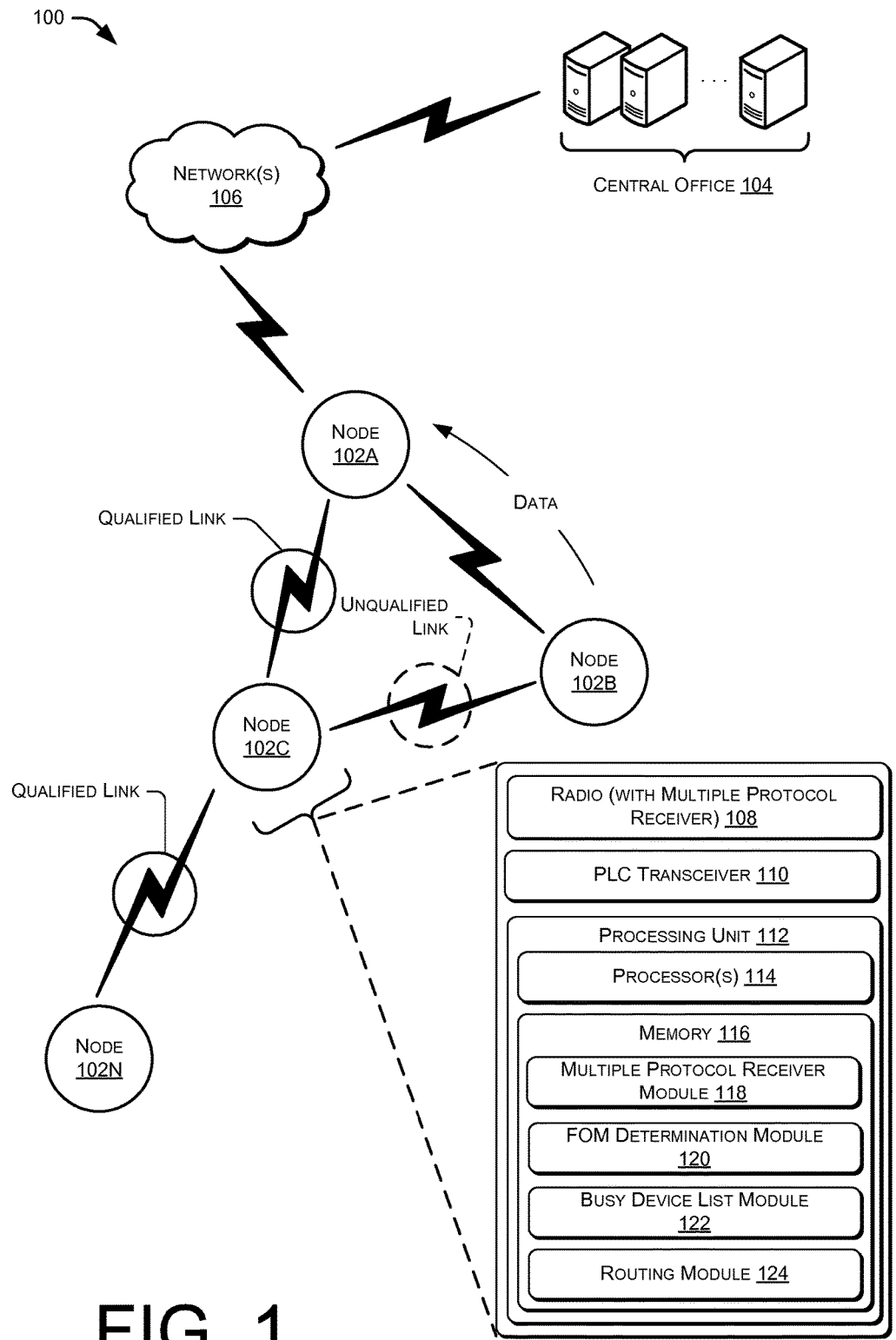
FIG. 1 is a diagram showing a high-level view of a mesh network having nodes configured with multiple protocol receivers.

Existing routing metrics are not well suited to routing communications in a heterogeneous mesh network, wherein nodes may utilize differing communication technologies, transmission medias, transmission data rates, modulations and/or protocols. As used herein, a "link" refers to a direct transmission path between two nodes of a network (i.e., a transmission that does not pass through another node). Such transmissions may be made by radio frequency (RF) signals and/or power line communication (PLC) signals. A data rate across a link between two nodes is at least partially dependent on the distance and propagation characteristics between the two nodes. Moreover, a maximum data rate across a path of links may be limited by the capabilities of the slowest node associated with the link.

This application describes techniques for intelligently routing communications between and/or among nodes of a heterogeneous mesh network that includes multiple different communication technologies (e.g., different transmission media, modulation techniques, data rates, protocols, etc.). Although this application describes various examples and embodiments in terms of a mesh network topology, other network topologies, such as star, fat tree, etc., may also utilize the technologies and embodiments described herein. In one example, this application describes using multiple protocol receivers that increase the connectivity of nodes, in part by determining a quality (e.g., figure of merit (FOM)) of links between nodes using different communication technologies, and routing communications based at least in part on the determined quality of the links.

Conventional routing metrics also typically do not account for the so-called "missing destination problem," in which destination nodes may miss transmissions intended for them because they are busy communicating with another node. When employing a conventional routing metric, a node that does not receive a response from an intended destination node may think that a collision has occurred and increase the size of its contention window (i.e., the amount of time the node will wait before attempting to retransmit the message). This increased wait time may cause unnecessary delay and inefficiency in propagating the transmission to its intended destination.

This application also describes maintaining a busy device list for each node, which includes availability information for one or more neighbor nodes. Communications may be routed based in part on availability information of neighbor nodes maintained in the busy device list.

Thus, in various embodiments described in this application, transmissions may be routed in a mesh network, or in networks using topologies other than a mesh topology, such as a star topology, using various transmission media, various communication technologies and various data rates, based on one or more metrics associated with link quality (e.g., a FOM), availability of neighbor nodes (e.g., based on a busy device list), or both. Consequentially, connectivity between nodes in the mesh network is improved, thereby improving throughput. Additionally, routing techniques may become more inclusive, incorporating a greater number of nodes within a heterogeneous mesh network.

The routing techniques are described herein in the example context of a utility mesh network including a plurality of nodes having multiple protocol receivers. Nodes of the utility mesh network may include, for example, low-power digital radios, smart utility meters (e.g., electric, gas, and/or water meters), sensors (e.g., temperature sensors, weather stations, frequency sensors, etc.), control devices, transformers, routers, servers, relays (e.g., cellular relays), switches, valves, and other network devices. As such, these nodes may include nodes of low power and lossy networks (LLNs). While the routing techniques are described in the context of a utility mesh network, the routing techniques may additionally or alternatively be applicable to other networks, network topologies and/or other applications. As such, in other implementations, nodes may include any device coupled to a communication network and capable of sending and/or receiving data.

Example implementations and embodiments are described below. In a first section "Overview of a Multiple Protocol Receiver," discusses an exemplary receiver of a node that may receive and process multiple types of communication technologies. A second section, "Overview of Routing Based on Link Quality," discusses routing data between nodes. A further section, "Overview of Routing Based on Node Availability," discusses an exemplary method of incorporating node availability with routing. A section entitled "Example Architecture" discusses an exemplary architecture of nodes in the mesh network. A section entitled "Example Node" discusses an exemplary architecture of a node usable to implement the link quality determination and routing techniques described herein. Several sections discuss example methods. A section entitled "Example Method of Determining Link Quality with Multiple Communication Technologies" discusses an exemplary use of a multiple protocol receiver to determine a quality of links. A section entitled "Example Method of Routing Based on Link Quality" discusses an exemplary use of link quality and routing. Following the discussion of the example routing processes, a section describing "Example Protocol Data Units (PDUs)" shows examples of link quality determination and routing methods. A section entitled "Example Method of Determining Degradation of an Operational Link" discusses an exemplary method of determining a degradation of a link during transmission of operational data. Finally, the application concludes with a brief "Conclusion." This Overview and the following sections, including the section headings, are merely illustrative implementations and embodiments and should not be construed to limit the scope of the claims.

Overview of a Multiple Protocol Receiver

In one example implementation, nodes may utilize a multiple protocol receiver. The multiple protocol receiver may alternate between first and second states. In a first state, the multiple protocol receiver listens for a plurality of different communication technologies that may include different modulated signals (e.g., FSK, OFDM, OQPSK, CDMA, etc.), signals on different communications media (e.g., RF and PLC), signals associated with different protocols, signals associated with different or variable data rates, and the like. Such listening may be performed in a parallel manner, wherein a plurality of preamble detection processes operates in a multitasking environment, each listening for a different preamble across the various communication technologies. The listening may result in recognition and/or detection of a preamble of a packet by one of the preamble detection processes. Such detection may trigger transition of the multiple protocol receiver to the second state. The detected preamble may indicate a protocol used in transmission of the packet. A packet demodulator may be selected based on the protocol used. The received packet may then be demodulated according to a data rate, synchronization, error correction and/or other factors indicated by the protocol or other data in the packet. The demodulated packet and/or the detected preamble may also provide other information, such as a communication technology of the received signal, available data rates, or the like. The received packet may be utilized by the receiving node, retransmitted or routed to a neighbor node. The multiple protocol receiver may return to the first state to repeat and continue the procedure.

In another example, the multiple protocol receiver listens for a plurality of different communication technologies to determine or measure a strength of received signals on links from neighbor nodes in a mesh network. The multiple protocol receiver may then rank received signals based on their strength, or a measure of their relative strength, and maintain a list of top ranked received signals. As such, this ranked list may provide an initial measure of quality of links to neighbor nodes.

Overview of Routing Based on Link Quality

In one example, quality metrics of links between nodes may be determined. The links may utilize multiple different communication technologies, and communications (e.g., packets) may be routed based at least in part on the quality metrics. In this example, a node having a multiple protocol receiver may select an initial list of links to neighbor nodes ranked based on relative received signal strength (e.g., a received strength indicator (RSI)). The node may then exercise the initial list of links by communicating over the links using available data rates of the multiple different communication technologies of the links. Based at least in part on the communicating, the node may then determine refined quality metrics for the links associated with various communication technologies and various data rates. For each link exercised, the node may determine an optimum refined quality metric (e.g., optimum cross product, figure of merit (FOM), etc.) associated with a specific communication technology and a specific data rate. The node may then rank links based on their optimum refined quality metric. The node may then route communications by selecting links based in part on their associated optimum refined quality metric, and transmit the communications via a selected link using the associated specific communication technology at the specific data rate associated with the optimum refined quality metric. In an embodiment, a node may select multiple links, multiple communication technologies and/or multiple data rates, based on their associated optimum refined quality metrics, to communicate duplicate or redundant data deemed as "high priority" that must be delivered.

In one example, the node may qualify links having a refined quality metric above a predetermined threshold. The node may then route communications to neighbor nodes with which the node has a qualified link. In another example, the node may use a routing protocol to route communications to neighbor nodes based in part on the determined refined quality metric of links between the node and neighbor nodes associated with various communication technologies.

If a node has a relatively small number of neighbor nodes (e.g., less than 10), the node may determine quality of the links between it and all of its neighbor nodes. Alternatively, if the node has many neighbor nodes, the node may determine a link quality between itself and a subset of its neighbor nodes. The node may continue to determine quality of links with its neighbor nodes until it determines a predetermined number of links (e.g., 5, 10, 20, etc.) that meet a threshold number, thereby ensuring a sufficient number of good communication paths for the node.

In an example implementation, for at least one or more of the multiple different communication technologies, the node may exercise a link by sending a request-to-send (RTS) message to a neighbor node sharing the link. The request to send message may designate communication channels and/or one or more data rates to test. In response, the node may receive a clear-to-send (CTS) message from the neighbor node indicating that the neighbor node is available to receive transmissions. The node may then proceed to test communication channels and/or data rates between the node and the respective neighbor node by sending test data packets to the neighbor node. Upon receiving the test data packets, the neighbor node may send back test data packets according to the communication channels, specified data rates or other protocol elements designated for test. Each of the test data packets may include an indication of a cost in time of transmission through the link. In one example, the test data packets may include actual data packets.

Upon receiving back the test data packets from the neighbor node, the node may calculate one or more quality metrics between the node and the neighbor node. The node may also send a confirmation packet including a number of test data packets the node received from the neighbor node. The neighbor node may use the confirmation packet to evaluate the link quality between the node and the respective neighbor node.

In one implementation, the node may determine a communication technology and data rate that optimizes an FOM quality metric of a link. The node may then qualify the link and add the link, the FOM quality metric, the communication technology and the data rate to a list of FOM links data. For example, a link may be qualified for a data rate that is less than a maximum data rate of a corresponding communication technology if, for example, a higher data rate results in an unacceptable decrease in a communication success rate (e.g., increase in packet loss rate, increase in bit error rate, etc.). In some examples, the list of FOM links data may include a ranking of links to neighbor nodes according to the relative quality of links.

Various different metrics may be used to calculate link quality (e.g., FOM) for one or more data rates between nodes based on one or more different communication technologies available on a link. In one specific example, link quality may be calculated based on an expected transmission time (ETT) of communications across multiple communication technologies available on the link. ETT may be calculated according to the following equation:

$$ETT = \frac{S}{B} \times ETX \quad \text{Equation (1)}$$

where $ETX = \frac{1}{1-P}$, $P = 1 - (1 - Pf) \times (1 - Pr)$,

P is a loss rate on a link,

Pf is a probability that a data packet successfully arrives at the neighbor node, Pr is a probability that a confirmation from the neighbor node is successfully received, S is packet size of the data packet (e.g., in Bits, or other units), and B is a bandwidth of the link between the two nodes (e.g., in Bits/second or other units).

For example, considering two nodes x and y, the Pf for node x will be the number of test data packets received by node y from node x divided by the number of test data packets sent by node x. The Pr for node x will be the number of test data packets received by node x from node y divided by the number of test data packets sent by node y. Pf and Pr for node y will be computed in the same way. Equation (1) is just one example routing metric that may be used to measure link quality, and, in other examples, various other metrics may be used to measure link quality.

If, after receiving the RTS, the neighbor node is not or will not be available to receive communications (e.g., the neighbor already has a previously scheduled communication), then the neighbor node may send back a not-clear-to-send (NCTS) message. If the neighbor node is busy communicating on another channel, then the neighbor node may not receive the RTS and, therefore, will not respond. If the node receives a NCTS or does not receive any response, then the node may wait a period of time and try again and/or may try a different neighbor node.

Overview of Routing Based on Node Availability

In another example implementation, a busy device list may be maintained for each node. The busy device list may include availability information for one or more neighbor nodes, and routing transmissions based on availability of the neighbor nodes. In this example, a node may receives some information (e.g., resource consumption data, a report, an alert, a status message, a software/firmware update, etc.) that is to be transmitted to a destination. The information may be received from a neighbor node or from a system or component (e.g., a local sensor or metrology module) of the node itself. Upon receipt of the information, the node may query a busy device list to determine an availability of one or more neighbor nodes. The node may then identify a neighbor node that, according to the busy device list, is available to receive transmissions and is capable of propagating the information to the destination. The node may then transmit the information to the identified neighbor node.

The busy device list is generally maintained in local memory of the node itself (e.g., at a medium access control (MAC) sub layer of the node). However, in some implementations, the busy device list may additionally or alternatively be maintained at another location on the network (e.g., a parent node, cellular router, relay, network storage device, or the like).

In one example, the busy device list may be generated, maintained, and updated based on reservation information contained in messages overheard on a control channel by the multiple protocol receiver of the node. The reservation information may identify nodes that are (or will be) busy and a duration during which they will be busy. This reservation information may be included in a variety of messages including, for example, request-to-send (RTS) messages addressed to other nodes of the mesh network, and/or clear-to-send (CTS) messages addressed to other nodes of the mesh network.

Example Architecture

FIG. 1 is a schematic diagram of an example architecture 100 of a multi-node mesh network using multiple protocol receivers in which transmissions can be routed according to link quality and/or availability of nodes. The architecture 100 includes a plurality of nodes 102A, 102B, 102C . . . 102N (collectively referred to as nodes 102) communicatively coupled to each other via direct communication paths or "links." In this example, N represents a number of nodes in an autonomous routing area (ARA), such as a wide area network (WAN), metropolitan area network (MAN), local area network (LAN), neighborhood area network (NAN), field area network (FAN), personal area network (PAN), or the like. As an example, nodes 102 may be configured in an RF mesh, a PLC mesh, or both. In one example, nodes 102 may be part of a low power and lossy network (LLN).

The term "link" refers to a direct communication path between two nodes (e.g., a "one hop" transmission that does not pass through or become propagated by another node). Each link may represent a plurality of channels or one or more variable data rate channels over which a node is able to transmit or receive data. Each link may include multiple communication technologies, such as one or more RF communication technologies, one or more PLC communication technologies, or both.

Each of the channels may be defined by a frequency range which is the same or different for each of the channels. In some instances, one or more channels may comprise RF channels communicated using RF communications technologies. In other instances, one or more channels may use a power line communication (PLC) system communicated using a PLC communications technology. Thus, a link may include portions based on multiple communication medias, such as RF and PLC portions. Likewise, various links may use multiple different RF and/or PLC communications technologies (e.g., various modulation techniques, bandwidths, data rates, center frequencies, protocols, etc).

The channels on a link may include a control channel and multiple data channels. In some instances, the control channel is utilized for communicating one or more messages between nodes to specify one of the data channels to be utilized to transfer data. Generally, transmissions on the control channel are shorter relative to transmissions on the data channels. Once specified, the nodes may move to the data channel for communication.

Each of the nodes 102 may be implemented as, or associated with, any of a variety of conventional computing devices such as, for example, smart utility meters (e.g., electric, gas, and/or water meters), sensors (e.g., temperature sensors, weather stations, frequency sensors, etc.), control devices, transformers, routers, servers, relays (e.g., cellular relays), switches, valves, power line communication (PLC) transceivers, combinations of the foregoing, or any device couplable to a communication network and capable of sending and/or receiving data.

In this example, the nodes 102 are also configured to communicate with one or more central processing facilities 104 via an edge device (e.g., cellular relay, cellular router, edge router, destination oriented directed acyclic graph (DODAG) root, etc.) which serves as a connection point of the ARA to a backhaul network(s) 106, such as the Internet or one or more public or private intranets. In the illustrated example, node 102A may serve as an edge device and/or cellular relay to relay communications from the other nodes 102B-102N of the ARA to and from the central office 104 via the network(s) 106.

As an example, node 102C may be representative of each of the nodes 102 and includes a radio with multiple protocol receiver 108, a PLC transceiver 110 and a processing unit 112.

The radio with multiple protocol receiver 108 comprises a radio frequency (RF) transceiver that may be configured to receive RF signals associated with multiple different RF communication technologies (e.g., FSK, OQPSK, OFDM, CDMA, etc.) at a variety of data rates, and transmit RF signals via one or more of a plurality of RF communication technologies. The radio with multiple protocol receiver 108 may be configured to listen for a plurality of different RF communication technologies in a parallel fashion across multiple links. Radio 108 may also be configured to determine, or facilitate determination of, a received signal strength, such as a "received signal indicator" (RSI) for one or more of the plurality of different RF communication technologies.

In some implementations, each of the nodes 102 includes a single radio with multiple protocol receiver 108 configured to send and receive data on multiple different channels, such as the control channel and multiple data channels of each communication link. The radio 108 may also be configured to implement a plurality of different data rates, protocols, signal strengths, and/or power levels. The architecture 100 may represent a heterogeneous network of nodes, in that the nodes 102 may include different types of nodes (e.g., smart meters, cellular relays, sensors, etc.), different generations or models of nodes, and/or nodes that otherwise are capable of transmitting on different channels and using different communication technologies, data rates, protocols, signal strengths, and/or power levels.

The power line communication (PLC) transceiver 110 is configured to transmit and/or receive one or more communication signals on electrical power wiring, including local power wiring and long distance high voltage transmission lines. PLC transceiver 110 may transmit and/or receive different types of power line communications that include one or more PLC communication technologies (e.g., narrowband PLC, broadband PLC, power line digital subscriber line (PDSL), power line telecom (PLT), power line networking (PLN), broadband over power lines (BPL), etc.) having one or more frequency bands, channels, data rates and/or types of modulation that may depend on the propagation characteristics of the power wiring used.

The processing unit 112 is coupled to radio 108 and PLC transceiver 110, and may include one or more processor(s) 114 communicatively coupled to memory 116. The memory 116 may be configured to store one or more software and/or firmware modules, which are executable on the processor(s) 114 to implement various functions. While the modules are described herein as being software and/or firmware executable on a processor, in other embodiments, any or all of the modules may be implemented in whole or in part by hardware (e.g., as an ASIC, a specialized processing unit, digital signal processor, etc.) to execute the described functions.

In the embodiment of FIG. 1, the memory 116 includes multiple protocol receiver module 118, figure of merit (FOM) determination module 120, busy device list module 122 and routing module 124.

Multiple protocol receiver module 118 may be configured to receive, decode, demodulate, descramble, decrypt, measure and/or process signals and/or data received from both radio 108 and PLC transceiver 110. Multiple protocol receiver module 118 may also be configured to control various features and functions of radio 108 and PLC transceiver 110. In an implementation, multiple protocol receiver module 118 may determine or detect, or facilitate the determination or detection of, an RSI of signals received by radio 108 and PLC transceiver 110. Multiple protocol receiver module 118 may also be configured to maintain a list of RSI values associated with communications technologies used on various links to neighbor nodes 102.

The FOM determination module 120 may be configured to determine and maintain a measurement (e.g., figure of merit (FOM)) of a quality of RF and PLC links between the nodes 102. As an example, FOM determination module 120 may be configured to send and receive data over specified links (e.g., links with a highest measured RSI) using available combinations of data rate, media (e.g., RF or PLC) and communication technology (e.g., modulation) for each specified link. FOM determination module 120 may be configured to determine an optimal combination of data rate, media and communication technology for each specified link based on a cross product of successfulness (e.g., communications success rate) and data rate for each of the available combinations. Additionally, as illustrated in FIG. 1, FOM determination module 120 may qualify links (i.e., a qualified link) having an FOM measurement that is above a pre-specified threshold and un-qualify links (i.e., an un-qualified link) having an FOM measurement that is below a pre-specified threshold. As such, nodes having qualified links may be determined to be neighbor nodes of node 102C.

As an example, if a link has both a high data rate RF communication technology with a low communication success rate, and a low data rate PLC communication technology with a high communication success rate, FOM determination module 120 may determine that the PLC communication technology has a higher FOM than the high data rate RF communication technology. Thus, FOM determination module 120 may associate the FOM, data rate, and PLC communication technology having a highest combination of success rate and data rate with the link. Thus, FOM determination module 120 may rate links with a higher combination of success rate and data rate better (e.g., a higher FOM) than links with a lower combination of success rate and data rate (e.g., a lower FOM). Consequently, FOM determination module 120 may not rate links solely on their success rate or data rate alone, but rather on a combination (e.g., cross product) of their communication success rate and data rate. Additionally, FOM determination module 120 may be configured to evaluate these combinations for multiple available communication technologies (e.g., RF and PLC) of associated links to determine an optimal combination across the multiple available communication technologies of a link.

The busy device list module 122 may be configured to determine availability of nodes 102 and to maintain a listing of the nodes which are (or will be) busy and a duration that they will be busy. In the illustrated example of FIG. 1, the busy device list module 122 would indicate that node 102B is busy transmitting data to node 102A and is, therefore, unavailable to receive transmissions from node 102C.

Routing module 124 is configured to implement and/or facilitate a routing protocol to route transmissions between and among nodes 102 of the ARA using available communication technologies (e.g., RF and PLC) based on a quality (e.g., FOM) of links between the nodes 102, availability of the nodes 102 determined by the busy device list module 122, and/or one or more other factors. As such, routing module 124 is configured to implement and/or facilitate a routing protocol that is agnostic regarding which communication technology is used when routing data among nodes 102. In an embodiment, routing module 124 is configured to route transmissions, such as transmissions deemed "high priority", in a duplicate or redundant fashion. As an example, routing module 124 may route "high priority" transmissions in a duplicate fashion, such that a "high priority" transmission may be simultaneously routed using multiple communication technologies (e.g., RF and PLC), multiple links, or the like. Additional details of how the routing module 124 may route communications based on these and other factors is provided below.

The memory 116 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

The network(s) 106 represents a backhaul network, which may itself comprise a wireless or a wired network, or a combination thereof. The network(s) 106 may be a collection of individual networks interconnected with each other and functioning as a single large network (e.g., the Internet and/or one or more intranets). Further, the individual networks may be wireless or wired networks, or a combination thereof.

The central office 104 may be implemented by one or more computing devices, such as servers, personal computers, laptop computers, etc. The one or more computing devices may be equipped with one or more processor(s) communicatively coupled to memory. In some examples, the central office 104 includes a centralized meter data management system which performs processing, analysis, storage, and/or management of data received from one or more of the nodes 102. For instance, the central office 104 may process, analyze, store, and/or manage data obtained from a smart utility meter, sensor, control device, router, regulator, server, relay, switch, valve, and/or other nodes. Although the example of FIG. 1 illustrates the central office 104 in a single location, in some examples the central office may be distributed amongst multiple locations and/or may be eliminated entirely (e.g., in the case of a highly decentralized distributed computing platform).

Example Node

Figure 2:
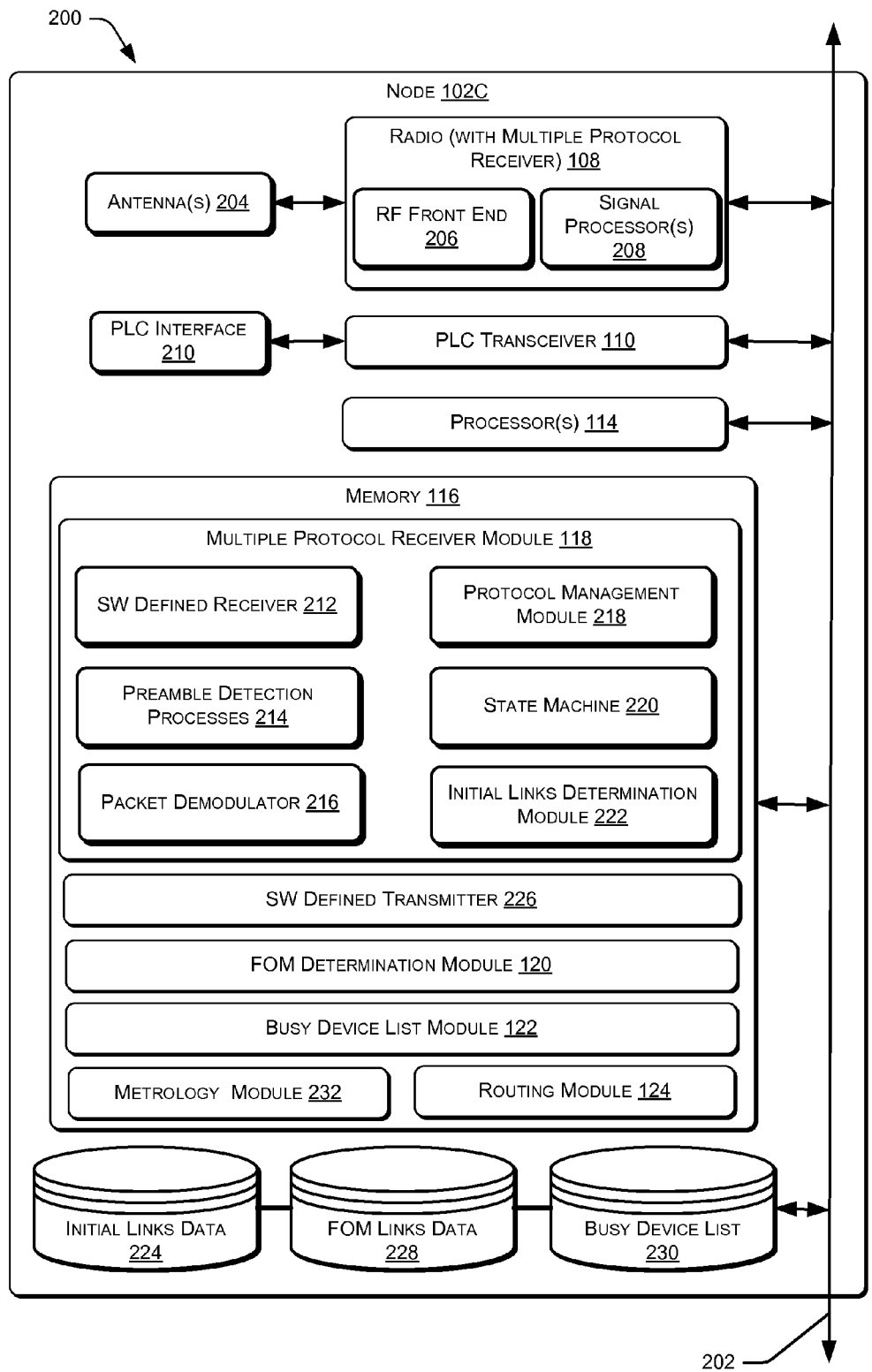
FIG. 2 is a schematic diagram showing additional detail of an example node from the mesh network of FIG. 1.

FIG. 2 is a schematic diagram of example environment 200 showing additional details of example node 102C of FIG. 1. Radio 108, PLC transceiver 110, processor(s) 114 and memory 116 are coupled together via a bus or other coupling mechanism 202. Coupling mechanism 202 may comprise direct and/or indirect wired (e.g., cable, coax, fiber optic, etc.) or wireless connections, a wired or wireless network, one or more communication busses, or combinations thereof. Radio 108 may have antenna(s) 204 for receiving and/or transmitting RF signals, for example, between neighboring nodes 102A, 102B and 102N. Antenna(s) 204 may include one or more directional or omni-directional antennas suitable to receive/transmit signals employing the various RF communication technologies used on links between nodes 102.

The RF front end 206 may include high-frequency analog and/or hardware components that provide functionality, such as tuning and/or attenuating signals provided by antenna(s) 204 and obtained from one or more of the nodes 102. As an example, RF front end 206 and antenna(s) 204 are configured to receive, in parallel, RF signals of RF communication technologies used by nodes 102. The RF front end 206 may be configured to provide received signals to one or more signal processor(s) 208. Likewise, signal processor(s) 208 may be configured to provide signals to RF front end 206 for transmission.

The signal processor(s) 208 may be configured to detect and/or process, in parallel or effectively in parallel, received signals of a plurality of RF communication technologies used by nodes 102 or other network devices. In one example, the signal processor(s) 208 may be configured to provide frequency, bandwidth, synchronization and/or channel selection functionality to radio 108. For example, signal processor(s) 208 may include digital signal processors, mixers, filters, amplifiers, modulators, demodulators, detectors, etc., implemented in hardware and/or software executed by a processor or application specific integrated circuit (ASIC) or other embedded computing device(s). The signal processor(s) 208 may be configured to utilize processor(s) 114 and software defined or stored in memory 116. Signal processor(s) 208 may be implemented at least in part using analog, digital or a combination of components.

As an example, signal processor(s) 208 may detect one or more signals of one or more RF communication technologies on links of node 102C, and measure, or facilitate the measurement of, a received signal strength, such as a "received signal indicator" (RSI), of each received signal. In an implementation, signal processor(s) 208 may be configured to discriminate between received signals of the same, similar or different RF communication technologies based on their RSI. In an implementation, signal processor(s) 208 may be configured to select a signal of a RF communication technology based on, or indicated by, the RSI of the signal relative to one or more other received signals, or based on the RSI of the received signal itself. Signal processor(s) 208 may detect a signal of a corresponding RF communication technology and may configure itself to optimize the reception of the detected signal of the corresponding RF communication technology. To facilitate locking onto a received signal, signal processor(s) 208 may adjust a bandwidth, gain, attenuation, frequency and phase of an oscillator, frequency and phase of a clock, or the like. Signal processor(s) 208 may be configured to provide an intermediate frequency (IF) signal, baseband signal and/or digital signal associated with the received signal to software defined or stored in memory 116. Likewise, signal processor(s) 208 may be configured to provide an intermediate frequency (IF) signal, baseband signal and/or digital signal to RF front end 206 for transmission to, for example, one or more of nodes 102.

In an implementation, signal processor(s) 208 may be configured to determine and provide an RSI value for each of one or more received signals to software defined or stored in memory 116. Additionally, signal processor(s) 208 may be configured to determine and provide an indication of the RF communication technology of each received signal to software defined or stored in memory 116. As such, signal processor(s) 208 may be configured to provide software defined radio functionality.

PLC transceiver 110 may utilize PLC interface 210 to provide connection to a power line communication system. A power line communication system may allow node 102C to communicate with, for example, other neighbor nodes that share connectivity with the power line communication system. PLC transceiver 110 may utilize processor(s) 114 and software defined or stored in memory 116 to facilitate communication over the power line communication system via PLC interface 210. In an implementation, PLC transceiver 110 may be configured to provide the received signal, an intermediate frequency (IF) signal, baseband signal and/or digital signal associated with the signal received via the power line communication system to software defined or stored in memory 116. Likewise, PLC transceiver 110 may be configured to provide a signal to PLC interface 210 for transmission via the power line communication system.

In one example, PLC transceiver 110 may be configured to determine, or facilitate a detection of, an RSI of a signal received via the power line communication system. PLC transceiver 110 may provide the RSI value, or an indicator of an RSI value, to software defined or stored in memory 116. In an embodiment, PLC transceiver 110 may be configured to provide an indication of the PLC communication technology of the received signal to software defined or stored in memory 116.

Multiple protocol receiver module 118 may reside all or in part in memory 116 and include software (SW) defined receiver 212, preamble detection processes 214, packet demodulator 216, protocol management module 218, state machine 220 and initial links determination module 222.

In an embodiment, SW defined receiver 212 may be implemented by software stored in memory 116. In an alternate embodiment, SW defined receiver 212 may be implemented by software stored in memory 116, as well hardware (not shown) such as one or more digital signal processors, analog hardware, digital hardware, or combinations thereof. In an implementation, SW defined receiver 212 may include components, otherwise implemented using analog components (e.g. mixers, filters, amplifiers, modulators and/or demodulators, detectors, etc.), implemented in software executed by a processor or application specific integrated circuit (ASIC) or other embedded computing device(s).

SW defined receiver 212 may be configured to communicate with radio 108 and PLC transceiver 110, for example, via interface 202. The SW defined receiver 212 may utilize processor(s) 114 and software defined or stored in memory 116. In an implementation, software-defined receiver 212 may work in conjunction with signal processor(s) 208, as well as RF front end 206, to facilitate measurement, detection, selection, identification, demodulation, synchronization, decoding, descrambling, decryption and/or processing of one or more signals received by radio 108. Additionally, software-defined receiver 212 may facilitate or control the configuration of signal processor(s) 208, as well as provide control for RF front end 206. Software-defined receiver 212 may work in conjunction with radio 108 to determine an associated RF communication technology of signals received by radio 108, as well as an RSI, effective RSI and/or normalized RSI of received signals. Software-defined receiver 212 may work in conjunction with radio 108 to facilitate selection of a signal when radio 108 receives more than one signal.

Software-defined receiver 212 may also be configured to work in conjunction with PLC transceiver 110 to facilitate detection, selection, identification, demodulation, synchronization, decoding, descrambling, decryption and/or processing of a signal received by PLC transceiver 110. In one example, software-defined receiver 212 may process, determine or know a-priori a PLC communication technology of a signal received by PLC transceiver 110. Additionally, the software-defined receiver 212 may be configured to determine an RSI, effective RSI and/or normalized RSI of a signal received by PLC transceiver 110 based on the received signal's strength and communication technology.

In one example, the software-defined receiver 212 may be configured to select, or facilitate selection of, one or more signals among one or more received RF signals and one or more received PLC signals based on signal strength or other signal quality criteria.

Figure 3:
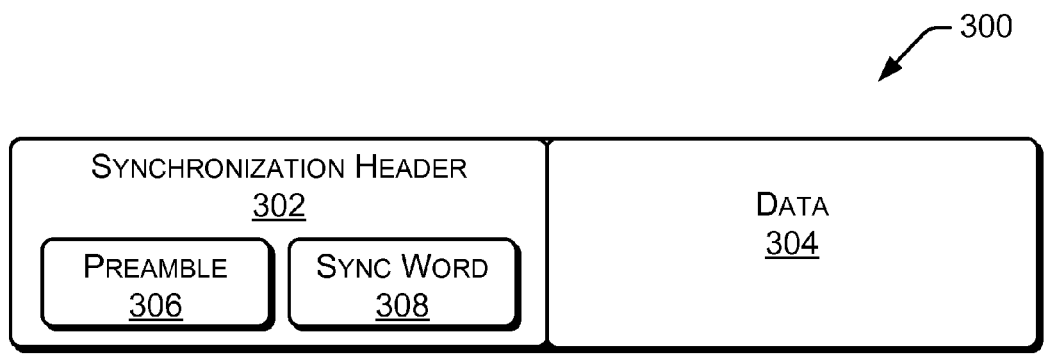
FIG. 3 is a diagram showing an example of packet structure usable with some multiple protocol receivers.

A plurality of preamble detection processes 214 may be configured for simultaneous, i.e., parallel, operation, such as in a multitasking environment. Each of the plurality of preamble detection processes 214 may be configured to detect and/or recognize a particular synchronization header and/or preamble of a particularly modulated signal and/or packet. Referring to the example of FIG. 3, which illustrates an example of a data packet received by the SW defined receiver 212, each of the plurality of preamble detection processes 214 may be configured to detect or recognize the preamble 306 in the packet 300. Similarly, each of the plurality of preamble detection processes 214 may be configured to detect the synchronization header 302, such as by detection or recognition of the preamble 306 and/or the sync word 308. Such detection or recognition may facilitate access to data 304 of packet 300.

Accordingly, each of the plurality of preamble detection processes 214 may be configured to recognize a particular preamble associated with a particular packet. Thus, detection and/or recognition by one of the plurality of preamble detection processes 214 of a particular preamble results in a determination or recognition of a particular protocol that was used to modulate a packet associated with the detected preamble. This association, between a recognized preamble and a protocol used to modulate the packet having the recognized preamble, may be made in any of a number of manners. In one example, preambles may be linked to protocols in a data structure. In a second example, each preamble detection processes 214 may point to an appropriate packet demodulator 216 from among a plurality of packet demodulators, wherein each packet demodulator is associated with one of a plurality of protocols. Accordingly, detection of a preamble by one of the plurality of preamble detection processes results in knowledge of a protocol and of an appropriate packet demodulator 216 associated with the protocol for use in demodulating the packet of a received signal. Such detection may be performed across RF and PLC communication technologies utilized by nodes 102.

A plurality of packet demodulators or packet demodulating processes 216 may be configured for serial or parallel operation. In one example, each of the plurality of packet demodulators 216 is associated with one of the plurality of preamble detection processes 214. In operation, successful detection of a preamble by a preamble detection process results in execution of a packet demodulator associated with that preamble detection process. Thus, once a protocol is recognized, a packet demodulator 216 associated with the recognized protocol is selected and executed. Execution of the packet demodulator 216 demodulates the packet and/or the data 304 according to the protocol associated with the demodulator. Thus, the packet demodulator 216 demodulates data (e.g., data 304) within the packet associated with the detected preamble using a bit rate, synchronization, error correcting redundancy, etc., associated with the protocol. Additionally, the packet demodulator 216 may configure and/or direct operation of software-defined receiver 212.

A protocol management module 218 may configured to manage operation of the preamble detection processes 214, the packet demodulators 216, the software defined receiver 212 and other structures, software objects and devices, as indicated by a particular application or design. In one example, the protocol management module 218 may utilize a state machine 220 or other logical construct to assist in the management of preamble detection, protocol recognition, packet demodulator selection and packet demodulation. Alternatively, a different logical control may be utilized to obtain similar results.

The state machine 220 may be defined to assist in the management of the operation of the multiple protocol receiver module 118. The state machine 220 is representative of any of a number of logical devices, constructs or techniques used to manage control and operation of a process, and to thereby call one or more processes or modules in a desired sequence and according to a desired timing. As an initial example, state machine 220 may utilize two or more states and allow movement between the states.

Example states include: (1) simultaneously listening for signals received by radio 108 and/or PLC transceiver 110 that indicate a packet, (2) detecting a preamble associated with the packet, (3) determining a protocol indicated by the preamble, and (4) demodulating the received packet according to the protocol. Each iteration of the above four states could be performed sequentially, and completion of the four states or failure at any state could result in return to the first state.

The initial links determination module 222 may periodically, or a-periodically, gather and maintain information pertaining to current received signal strength (e.g., RSI) across links of a node 102, such as exemplary node 102C. As such, initial links determination module 222 may be configured to facilitate discovery of nodes 102, such as neighbor nodes of node 102C. As an example, initial links determination module 222 may obtain, determine, process and/or maintain RSI information for links associated with node 102C in a list. Initial links determination module 222 may obtain RSI information associated with the links of node 102C during a real time operation of node 102C, while node 102C is in a listening mode, in response to one or more requests from node 102C, in response to one or more external requests for neighbor nodes of node 102C to transmit over their associated links, or combinations thereof.

Initial links determination module 222 may be configured to associate and maintain one or more RSI values of a link with the link's corresponding communications technology(s), media(s) and/or protocol(s). In addition to maintaining an RSI value that indicates a detected received energy or received power level of a received signal, initial links determination module 222 may be configured to determine an RSI value of a received signal as an effective or normalized RSI value as a function of a media and/or communication technology of the received signal on a link. As an example, initial links determination module 222 may determine effective or normalized RSI values that allow for comparing a received signal strength of a signal having FSK (i.e., frequency shift keying) modulation to a received signal modulated using, for example, QAM (quadrature amplitude modulation) and having OFDM (orthogonal frequency-division multiplexing) encoding. Initial links determination module 222 may access information (e.g., conversion tables, formula tables, etc.) from initial links data 224 storage required for determining effective or normalized RSI values.

Initial links determination module 222 may be configured to rank links to neighbor nodes of node 102C based on their associated RSI values, effective RSI values and/or normalized RSI values. Initial links determination module 222 may be configured to select a number of links associated with neighbor nodes having a highest ranked RSI value. The number of links selected may be predetermined, may be a percentage of total detected links, may be based on the RSI values themselves (e.g., RSI values above a predetermined threshold, relative strength of RSI values, etc.), or combinations thereof. As an example, initial links determination module 222 may select the top 10-20 neighbor nodes (e.g., short list of neighbor nodes) having links with the top ranked RSI values. Initial links determination module 222 may store information associated with top ranked links—such as link designators, RSI values corresponding to link designators, media and communication technologies associated with RSI values corresponding to link designators, etc.—in initial links data 224 storage.

In one example, the SW defined transmitter 226 may be configured to facilitate transmission of a packet, other data or signal via radio 108 or PLC transceiver 110. SW defined transmitter 226 may transmit the packet, data or signal using a configurable or pre-specified communication technology. SW defined transmitter 226 may be configured to control various aspects of radio 108 and PLC transceiver 110 to facilitate transmission of data using various different RF and PLC communication technologies. As an example, SW defined transmitter 226 may be configured to facilitate transmission of a packet, other data or signal in a duplicate or redundant fashion in a simultaneous, or near simultaneous manner via both radio 108 and PLC transceiver 110. SW defined transmitter 226 may be configured to facilitate transmission of a packet, other data or signal in a duplicate or redundant fashion in a simultaneous, or near simultaneous manner using different communication technologies over the same or different links.

The FOM determination module 120 may be configured to determine and maintain a measurement (e.g., figure of merit (FOM)) of a quality of RF and PLC links between nodes 102, such as links to nodes neighboring node 102C. As an example, FOM determination module 120 may exercise links indicated by initial links determination module 222 as having a top ranked RSI value. By focusing on these specified links, FOM determination module 120 may save time and resources relative to exercising a greater number of links, including links having lower RSI values.

In one example, the FOM determination module 120 may exercise specified links by sending data over the specified links and measuring data returned in response. Since the specified links may be ranked or associated with top ranked RSI values, the RSI value associated with each link may be thought of as an initial quality measurement. Thus, by exercising the specified links, FOM determination module 120 may refine a quality metric associated with each specified link to obtain a better or refined (e.g., more accurate, more confident, reduced variance, etc.) measurement of the quality of the specified links.

In a further example, the FOM determination module 120 may exercise specified links by sending and receiving data using combinations of available data rate(s), available channels, available media (e.g., RF and PLC) and available communication technologies (e.g., modulation schemes) for each specified link. As an example, FOM determination module 120 may ascertain (e.g., a-priori, via query, via data extracted from a communication, via table lookup, etc.) that a node on a specified link supports two RF communication technologies (e.g., two different modulation schemes, two modulation schemes operating in different bandwidths, etc.) and a PLC communication technology. FOM determination module 120 may then exercise both RF communication technologies and the PLC communication technology at available data rates to determine an optimal combination of data rate and communication technology for the link. FOM determination module 120 may then associate an FOM value or metric with the optimum combination, and store the optimal FOM value or metric, data rate and communication technology in FOM links data 228.

In an alternate embodiment, FOM determination module 120 may limit exercising a link to the communication technology indicated by initial links determination module 222 as having the top ranked RSI value. As an example, a node on the other end of a specified link may support an RF communications technology and a PLC communications technology. Initial links determination module 222 may have previously determined that the RF communications technology of the node has a top ranked RSI value, while the PLC communications technology of the node has a low ranked RSI value. Thus, to further conserve time and resources, FOM determination module 120 may focus solely on exercising the RF communications technology of the node having the top ranked RSI value to find the optimal FOM and optimal data rate using the RF communications technology. FOM determination module 120 may then store the optimal FOM value, data rate and communication technology associated with the link in FOM links data 228.

The example embodiments of FOM determination module 120 presented above are not intended to limit how FOM determination module 120 may exercise links. As another example, a link may support two RF communication technologies and a PLC communication technology. In this example, FOM determination module 120 may exercise a first of the two RF communication technologies indicated as having a top ranked RSI value, as well as the PLC communication technology, and store the optimal determined FOM value, data rate and communication technology associated with the link in FOM links data 228. FOM determination module 120 may also store an FOM value and optimal data rate for both the first RF communications technology and the PLC communications technology in FOM links data 228. Other example embodiments are within the scope teachings herein.

In various implementations, FOM determination module 120 may determine and maintain a refined quality (e.g., an FOM) of a link based on a cross product of successfulness (e.g., a communications success rate) and a data rate for available data rate combinations. As an example, for a given link, the FOM determination module 120 may find an optimal combination of media, communications technology and data rate that minimizes (or maximizes an optimization of) the ETT value of Equation 1. In a different implementation, the FOM determination module 120 may use other suitable quality optimization metrics for finding an optimal FOM associated with a highest data rate and minimum packet loss or minimum bit error rate combination for the available communication technologies of a link.

The FOM determination module 120 may store FOM data for associated links in FOM links data 228 store. FOM links data 228 store may also contain the combination of media, communication technology and data rate associated with the FOM data for each specified link. In an alternate embodiment, FOM determination module 120 may maintain FOM values and their associated combination of media, communication technology and data rate for a subset of the specified links or additional links in FOM links data 228 store. As an example, upon exercising the specified links, FOM determination module 120 may determine that one or more of the specified links having a top ranked RSI value exhibited a link quality below a relative, pre-specified or pre-determined threshold. Thus, FOM determination module 120 may not store information pertaining to these links in FOM links data 228 store. In an embodiment, FOM determination module 120 may also store one or more protocols supported by nodes on links that are exercised.

The busy device list module 122 is configured to determine availability of nodes 102 and to maintain a listing of the nodes which are (or will be) busy and a duration that they will be busy. Busy device list module 122 may store availability information associated with nodes in busy device list 230 store. In the illustrated example of FIG. 1, the busy device list module 122 may indicate that node 102A is busy receiving data from node 102B and is, therefore, unavailable to receive transmissions from node 102C. In this example, a multiple protocol receiver of node 102A may be in a receive state. Thus, the multiple protocol receiver of node 102A is not currently in a listen state, where it can detect a communication request, such as a request to send (RTS) packet from node 102C. Therefore, for each neighbor node 102, busy device list module 122 may maintain a neighbor node availability and a duration that the neighbor node will be busy in busy device list 230. Additionally, for each neighbor node 102, busy device list module 122 may maintain, in busy device list 230, neighbor node state information indicating a current state of neighbor nodes (e.g., listening for signals, processing a signal, etc.).

While the initial links data 224, the FOM links data 228 and the busy device list 214 are shown as being lists of data stored in local memory of the node 102C, in other embodiments, the link quality and node availability information may be stored in a single list or in a non-list form. Furthermore, in some embodiments, the link quality and node availability information and other information stored in initial links data 224, the FOM links data 228 and the busy device list 214 may additionally or alternatively be maintained at one or more other locations on the network (e.g., a parent node, cellular router, relay, network storage device, or the like).

In some implementations (e.g., when the node is a utility meter), the memory 116 may also include a metrology module 232 configured to collect consumption data of one or more resources (e.g., electricity, water, natural gas, etc.), which may then be transmitted to one or more other nodes 102 for eventual propagation to the central office 104 or other destination. In various implementations, metrology module 232 may periodically or a-periodically provide data for transmission, may be queried and provide data in response to a query, may provide data for transmission once a predetermined amount of data has been collected, or the like.

Routing module 124 facilitates the implementation of a routing protocol (e.g., Routing Protocol for Low power and Lossy Networks (RPL), LOAD, DODAG based routing, distance vector routing, routing based on a current or predicted load of one or more nodes, etc.) based on FOM values of links associated with node 102C, availability of the nodes 102, and/or one or more other factors. As an example, for routing a packet at node 102C destined for node 102A, routing module 124 may facilitate a routing protocol to choose the direct link between node 102C and 102A (as shown in FIG. 1), based on the FOM value of that link relative to other links as indicated in FOM links data 228 and the current availability of node 102A as indicated in busy device list 230. As such, routing module 124 may access FOM links data 228 to determine an optimal combination of media, communications technology and data rate associated with the FOM value of the selected link between node 102C and 102A. Assuming node 102A is currently available, routing module 124 may facilitate the routing protocol to route the packet to node 102A via the link. As an alternative, if node 102A is currently specified as busy, routing module 124 may facilitate choosing to wait for node 102A to become available based on a duration that node 102A will be busy as specified in busy device list 230. As another alternative, the routing protocol may choose a different link associated with node 102C based on the different link's FOM value and associated node availability. Thus, routing module 124 may choose an optimal combination of media, communications technology and data rate associated with the FOM value of the different link. In a further example, the routing module 124 may configure and/or direct SW defined transmitter 226 to transmit the packet over a determined link, using the specified media, communications technology and data rate for that link.

Figure 4:
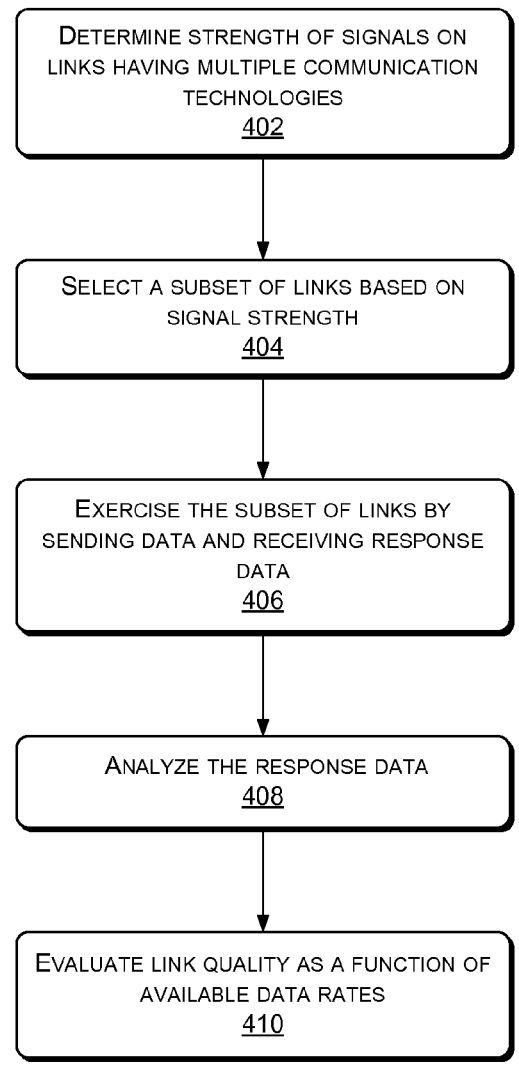
FIG. 4 is a flowchart illustrating an example method of determining a quality of links between nodes of the mesh network.

Example Method of Determining Link Quality with Multiple Communication Technologies FIG. 4 illustrates an example method 400 of determining quality of links having multiple communication technologies between nodes of a mesh network. The method 400 is described with reference to the example architecture 100 of FIG. 1 for convenience. However, the method 400 is not limited to use with the example architecture 100 of FIG. 1 and may be implemented using other architectures and devices.

At operation 402, a node determines a strength of received signals on communication links from neighbor nodes in a mesh network. In one example, the received signals include multiple different communication technologies. In the context of the examples of FIGS. 1 and 2, the determination of received signal strength may be performed by node 102C using radio 108, PLC transceiver 110, multiple protocol receiver module 118, SW defined receiver 212, initial links determination module 222, or combinations thereof. As an example, if node 102C is in a listening state, node 102C may listen, in parallel, to links to nodes 102A, 102B and 102N, and measure an RSI of multiple different communication technologies on each of the links to determine an associated RSI, effective or normalized RSI for communication technologies utilized on the links. The communication technologies may include RF and PLC communication technologies used on each of the links. As another example, node 102C may measure an RSI of multiple different communication technologies on links as part of operational communications with associated neighbor nodes.

Node 102C, as well as its corresponding neighbor nodes may include nodes of a low power and lossy network (LLN). The multiple different communication technologies may include multiple different radio frequency (RF) communication technologies having different RF modulation schemes as well as one or more power line communication (PLC) technologies.

Figure 6:
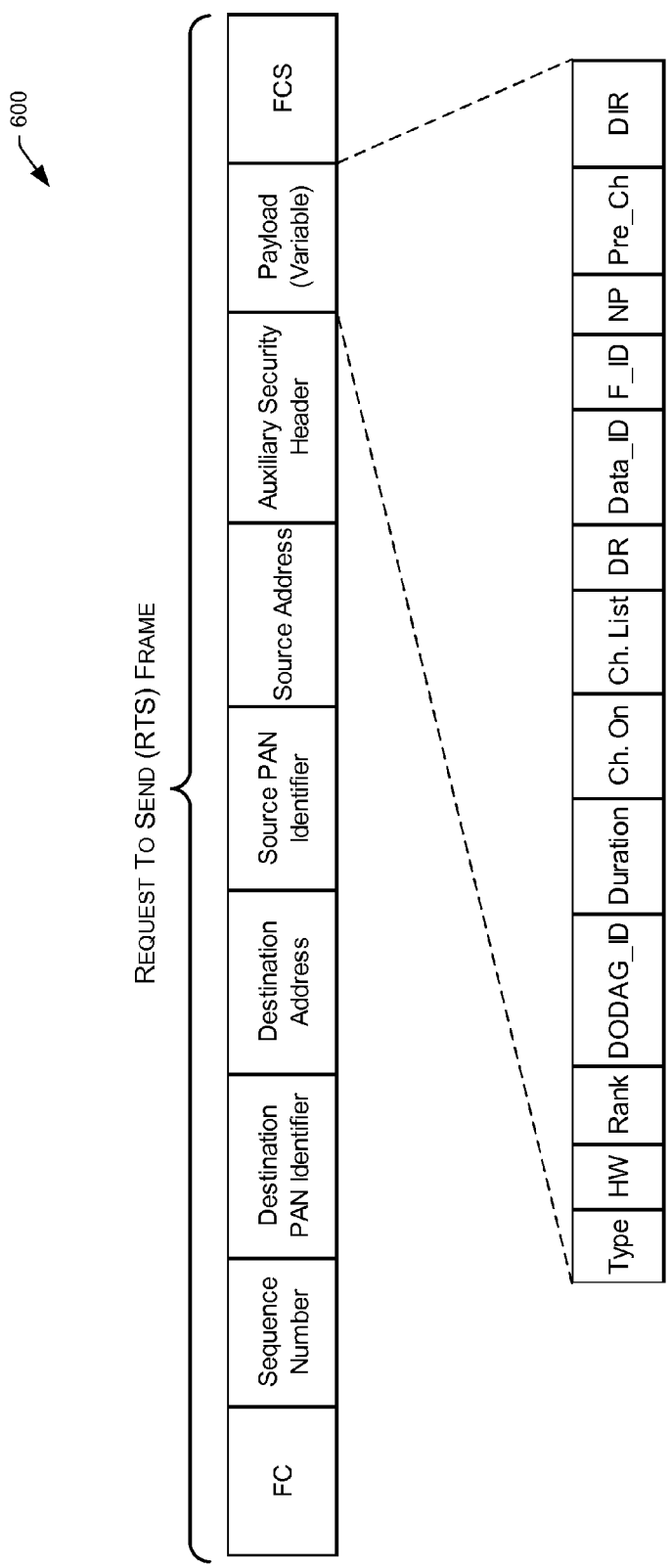
FIG. 6 is a schematic diagram illustrating an example frame structure of a request-to-send message that may be used to indicate that a node has data available to sent to another node.
Figure 7:
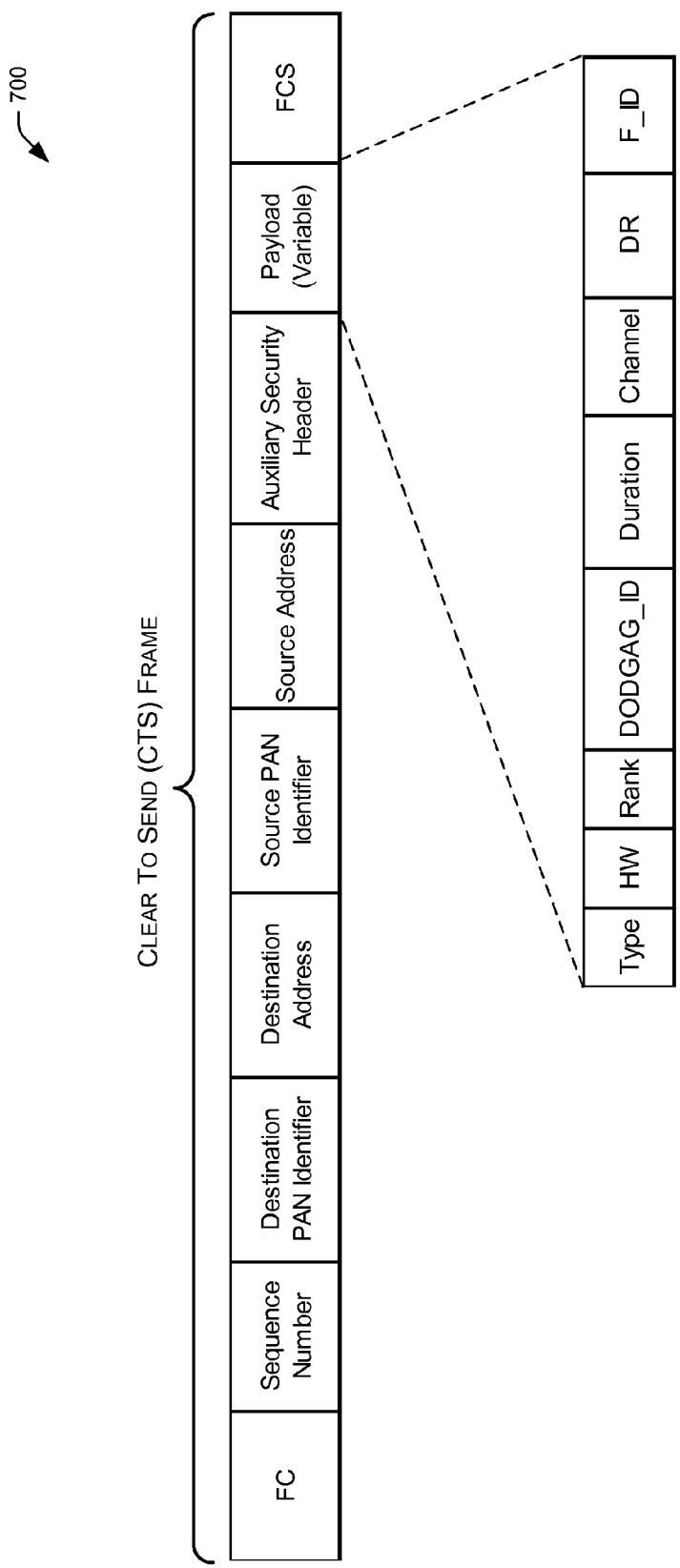
FIG. 7 is a schematic diagram of an example frame structure of a clear-to-send message that may be used to indicate that a node is available to receive data.

At operation 404, in the context of the examples of FIGS. 1 and 2, initial links determination module 222 of node 102C selects a subset of the communication links based in part on the strength of the received signals. At operation 406, a subset of communications links is exercised by sending data and receiving response data via each of the subset of the communication links. As an example, FOM determination module 120 may perform the sending of data and the receiving of response data at available data rates of a communication technology used over each of the subset of the communication links. As another example, FOM determination module 120 may perform the sending of data and the receiving of response data using more than one communication technology used over one or more of the subset of the communication links. The data sent and received as part of the exercising may include test data, operational data, or a mix of test and operational data. Test data may include any repetitive or non-repetitive data that facilitates the exercising. Operational data may include actual data, such as payload data, metric data obtained by the node, metering data, or the like. Operational data may also include frame data as illustrated in FIGS. 6 and 7 herein.

At operation 408, in the context of the examples of FIGS. 1 and 2, FOM determination module 120 analyzes the response data. Based in part on analyzing the response data, at operation 410, FOM determination module 120 evaluates a link quality as a function of an available data rate of each of the subset of the communication links. As an example, FOM determination module 120 may compute an ETT of Equation 1 as part of evaluating the link quality. FOM determination module 120 may evaluate the link quality as a function of an available data rate that includes determining a figure of merit (FOM) represented by a cross product of a communication success rate and an available data rate, wherein an optimum FOM is indicated by a highest available data rate that optimizes the cross product (e.g., minimizes ETT). In an alternate implementation, FOM determination module 120 may determine a figure of merit (FOM) associated with a maximum combination of the link quality and the available data rate for communication technologies of each of the subset of the communication links.

In one example, busy device list module 122 of node 102C maintains information including an availability, unavailability and duration of unavailability of at least a subset of neighbor nodes in busy device list 230, while FOM determination module 120 maintains information identifying a communication technology and an available data rate associated with the FOM for each of the subset of the communication links in FOM links data 228. Then, in the context of the examples of FIGS. 1 and 2, routing module 124 may employ a routing protocol to select a communication link of the subset of the communication links for routing of a data packet to a neighbor node based in part on the FOM associated with the selected communication link and the availability of the neighbor node, and direct SW defined transmitter 212 to transmit the data packet to the neighbor node using the optimum communication technology and the optimum available data rate of the selected communication link (e.g., via radio 108 or PLC transceiver 110). As another example, routing module 124 may select multiple links, multiple communication technologies and/or multiple available data rates based in part on their associated FOM to transmit a "high priority" data packet in a redundant or duplicate fashion to assure delivery of the "high priority" data packet. Associated data may be stored in initial links data 224, FOM links data 228 and busy device list 230 prior to node 102C requiring to route the data packet, such that associated RSI and FOM data is not required to be determined as part of a "handshaking" procedure between nodes performed based on the requirement to route the data packet.

Method 400 may be performed when a new node is added to the network and periodically or a-periodically for existing nodes of the network. All or parts of method 400 may be performed in response to a determination that a link quality has degraded below a determined or pre-specified threshold, such as during a communication of operational data or by any determination of suspected or actual link quality degradation.

Example Method of Routing Based on Link Quality

Figure 5:
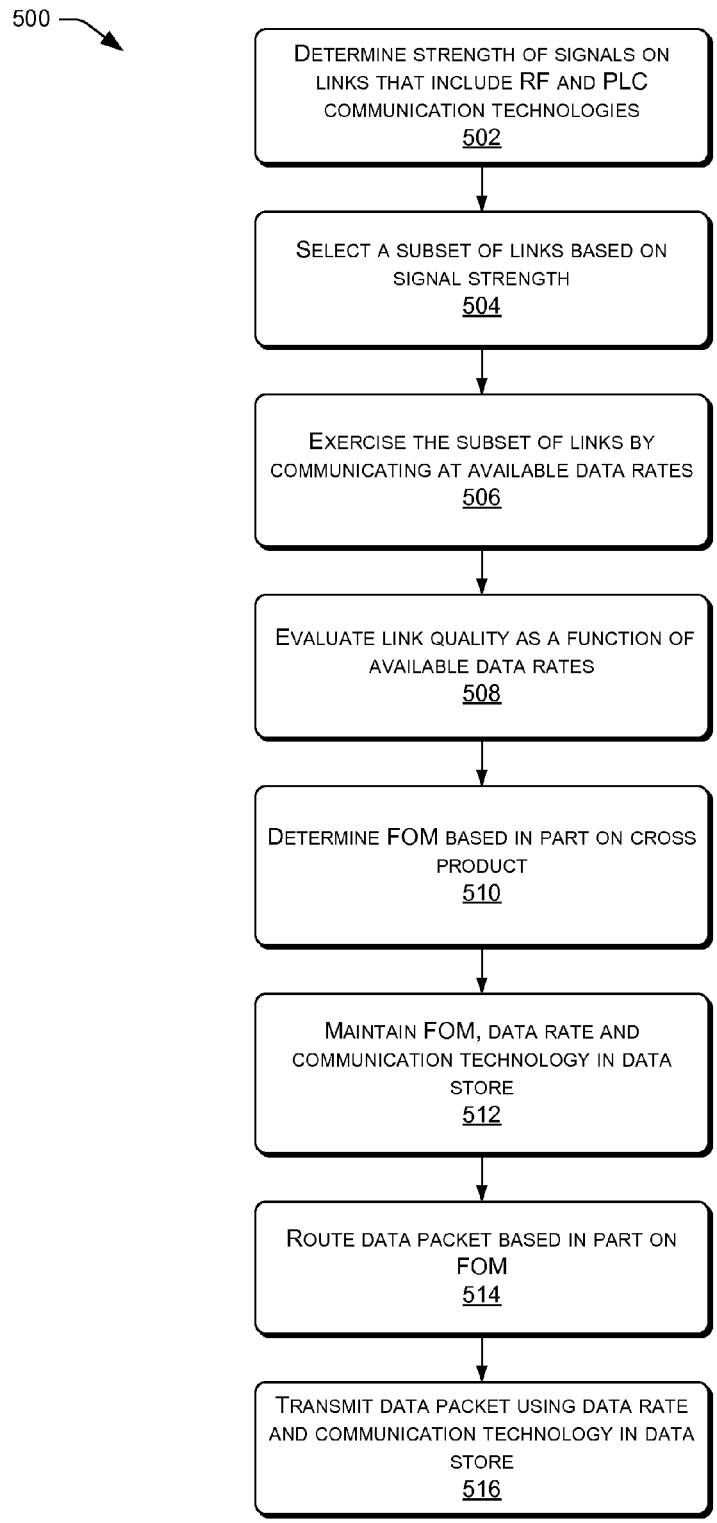
FIG. 5 is a flowchart illustrating an example method of routing transmissions in a mesh network according to a quality of links between nodes of the network.

FIG. 5 illustrates an example method 500 by which a quality of links may be determined. The links may utilize multiple communication technologies, thereby connecting nodes of a mesh network and routing communications based at least in part on the link quality. The method 500 is described with reference to the example architecture 100 of FIG. 1 for convenience. However, the method 500 is not limited to use with the example architecture 100 of FIG. 1 and may be implemented using other architectures and devices.

At operation 502, a node determines, via a multi-protocol receiver of the node, a strength of received signals on communication links from neighbor nodes in a mesh network, the received signals including signals having multiple different radio frequency (RF) communication technologies and one or more power line communication (PLC) communication technologies. In the context of the examples of FIGS. 1 and 2, the determination of received signal strength may be performed by node 102C using radio 108, PLC transceiver 110, multiple protocol receiver module 118, SW defined receiver 212, initial links determination module 222, or combinations thereof.

At operation 504, a subset of the communication links based in part on the strength of the received signals is selected. For example, initial links determination module 222 of node 102C selects the subset of the communication links based in part on the strength of the received signals.

At operation 506, in the context of the examples of FIGS. 1 and 2, FOM determination module 120 exercises the subset of the communication links by communicating data at available data rates of each of the subset of the communication links. FOM determination module 120 may perform the exercising by using more than one communication technology of one or more of the subset of the communication links, such as an RF and a PLC communication technology or a first RF communication technology and a second RF communication technology that differs from the first RF communication technology. The data utilized for the exercising may include test data, operational data, or a mix of test and operational data. Test data may include any repetitive or non-repetitive data that facilitates the exercising. Operational data may include actual data, such as payload data, metric data obtained by the node, metering data, or the like. Operational data may also include frame data as illustrated in FIGS. 6 and 7 herein.

At operation 508, in the context of the examples of FIGS. 1 and 2, FOM determination module 120 evaluates a link quality as a function of the available data rates for each of the subset of the communication links based in part on the communicating data. As an example, if a communication technology of a link has N (i.e., N being an integer greater than zero) available data rates, FOM determination module 120 may exercise all N data rates, or a subset of the N data rates, to evaluate link quality as a function of the available data rates.

At operation 510, in the context of the examples of FIGS. 1 and 2, FOM determination module 120 determines a figure of merit (FOM) based in part on a cross product that indicates a maximum combination of the link quality and the available data rates evaluated for each of the subset of the communication links. As an example, FOM determination module 120 may compute an ETT of equation 1 as part of determining the FOM. FOM determination module 120 may determine a figure of merit (FOM) represented by a cross product of a communication success rate and an available data rate evaluated, wherein an optimum FOM is indicated by a highest available data rate evaluated that optimizes the cross product (e.g., minimizes ETT). The optimum FOM may indicate a tradeoff of an optimization where connectivity is maximized while capacity (e.g., throughput) is maintained as high as possible. In an alternate implementation, FOM determination module 120 may determine a figure of merit (FOM) associated with a maximum combination of the link quality and the available data rates evaluated for each link of the subset of the communication links.

At operation 512, in the context of the examples of FIGS. 1 and 2, FOM determination module 120 maintains one or more records of the determined FOM, available data rate evaluated and communication technology associated with the determined FOM for each of the subset of the communication links in a data store, such as FOM links data 228.

At operation 514, in the context of the examples of FIGS. 1 and 2, routing module 124 routes a data packet to a neighbor node based in part on the FOM associated with each of the subset of the communication links. As an example, routing module 124 accesses FOM links data 228 to obtain FOM data records for links to neighbor nodes of node 102C. Routing module 124 may then use the FOM data to facilitate a routing protocol to select one of the subset of the communication links for the routing of the data packet. In an alternate implementation, routing module 124 may also access busy device list 230 to obtain availability information regarding neighbor nodes. Routing module 124 may then use the FOM data and the availability data to facilitate a routing protocol to select one of the subset of the communication links for the routing of the data packet. As such, the FOM may be exploited by a variety of routing protocols. Thus, if the technology enables parallel detection of incoming messages on a total collection of media, modulation type and data rates, then maximum connectivity may be achieved in the mesh network without sacrificing capacity, which is typical with many time and/or frequency division techniques.

At operation 516, based on the link selected by the routing protocol, in the context of the examples of FIGS. 1 and 2, routing module 124 accesses FOM links data 228 to identify the data rate and communications technology associated with the selected link. Routing module 124 then directs SW defined transmitter 212 to transmit the data packet to the neighbor node via the selected link using the data rate and communication technology (e.g., RF or PLC) specified in FOM links data 228. In an alternate embodiment, routing module 124 may access FOM links data 228 to identify multiple data rates and/or communications technologies associated with one or more links to determine how to route "high priority" data in a duplicate or redundant fashion.

Method 500 may be performed when a new node is added to the network and periodically or a-periodically for existing nodes of the network. All or parts of method 500 may be performed in response to a determination that a link quality has degraded below a determined or pre-specified threshold, such as during a communication of operational data or by any determination of suspected or actual link quality degradation.

Example Protocol Data Units (PDUs)

FIGS. 6 and 7 illustrate several example protocol data units (PDUs) which may be transferred via a control channel and/or data channel. The term PDU is used herein to refer generally to any communication, message, or transmission within a communication network, such as that shown in FIG. 1. The term PDU is based, at least in concept, on the Open Systems Interconnection (OSI) Model, an IP (Internet Protocol) Model, or the like, and may comprise, for example, a bit, a frame, a packet, a segment, etc. In some instances, one or more layers of the OSI/IP model may be effectively utilized to transfer one or more PDUs between nodes. For example, the data link layer of the OSI/IP model may be utilized to transfer PDUs between two or more of the nodes 102 in the architecture 100. In particular implementations, the media access control (MAC) sub-layer of the data link layer may be utilized to transfer PDUs between two or more of the nodes 102. Further, in some implementations, an access method may be utilized to transfer PDUs, such as the carrier sense multiple access with collision avoidance (CSMA/CA) method.

FIG. 6 illustrates an example request-to-send (RTS) frame 600 that may be used to indicate that a node wishes to send data to another node, while FIG. 7 illustrates an example clear-to-send (CTS) frame 700 that may be used to indicate that a node is available to receive data. FIGS. 6 and 7 show example field orderings in the corresponding frames, however, other orderings may be used. In some examples, upon receiving a RTS message, a node may respond (if available) by sending a CTS message. In this example, the RTS and CTS frame structures are defined in part by the IEEE 802.15.4(e) standard. However, in other examples other PDU structures may be used for the RTS messages, CTS messages, or other communications conveying reservation information associated with the multi-channel communication network (e.g., IEEE 802.11, IEEE 802.15, IEEE 802.16, IEEE P1901, IEEE P1675, IEEE P1775, etc.).

As discussed above, the RTS frame 600 and the CTS frame 700 (collectively referred to as data frames 600 and 700) contain information that is usable to qualify and facilitate evaluation of links between nodes of a mesh network and to route communications between and among nodes of the mesh network. The frames 600 and 700 are described with reference to the example network of architecture 100 of FIG. 1 and the example methods 400 and 500 for convenience. However, the example frames 600 and 700 are not limited to use with the example architecture 100 or the methods 400 and 500, and may be implemented using other architectures and devices and/or to perform other methods.

Referring to FIG. 6, the example RTS frame may be used for one or more communication technologies to inform neighboring nodes that a node wishes to send data and will not be available for another transmission, and to negotiate a particular data channel and one or more physical (PHY) parameters (e.g., data rate and/or modulation technique) with an intended recipient node. As shown in FIG. 6, the RTS frame includes the following fields: frame control (FC), sequence number, destination personal area network (PAN) identifier, destination address, source PAN identifier, source address, auxiliary security header, payload, and frame check sequence (FCS). Details of the foregoing fields of the RTS frame other than the payload are well known to those skilled in the art and are not described in detail herein. The payload of the RTS frame, however, is customized to implement the routing techniques described above, as well as other functionalities. The payload may be variable in size and may include, for example, one or more of the following fields:

Type: This field indicates a type of the frame, e.g., RTS, CTS, not-clear-to-send (NCTS), etc. In the example of FIG. 6, this field indicates that the frame is an RTS frame.

HW: This field indicates a type of hardware of a node sending the RTS frame. The type may include, for example, a version or generation of device, and/or any other information usable to determine capabilities of the node (e.g., battery powered, modulation techniques, PLC capabilities and/or available data rates that are supported by the node).

Rank: This field indicates a Routing Protocol for Low power and Lossy networks (RPL) rank (if known) of the node which is sending the RTS frame. The rank represents the cost of the path from the neighbor to the cell router and may be computed using, for example, the metric of Equation (1) to compute the ETT. The higher the rank is, the farther the node is from the cell router. This field may be utilized by a receiving node for routing consistency detection at the MAC sub-layer.

DODAG_ID: This field is a Destination Oriented Directed Acyclic Graph (DODAG) identifier (ID), which identifies a DODAG root (e.g., a network border router, cellular router, relay, etc.), through which the node sending the RTS is connected to a backhaul network, such as an intranet or the Internet, for communication with central office or other network computing device. In the context of the architecture 100 of FIG. 1, Node A is an example of a DODAG root of the architecture 100 which is in communication with network 106, which is an example of a backhaul network. The DODAG_ID allows a node which receives the RTS frame to accept or reject the RTS frame by verifying routing consistency conditions at the MAC sub-layer.

Duration: This field indicates a total expected time for exchanging data frame(s) specified in the RTS. The duration may include time to transmit the specified data frames, waiting times such inter-frame spacing (IFS) (e.g., SIFS, GIFS, etc.) between frames, and acknowledgment (ACK) or non-acknowledgement (NACK) responses. The duration field may be used to determine a duration that a node will be busy communicating with another node and therefore unavailable to receive. The duration field may be used to populate the "Duration" column of a busy device list, such as busy device list 230 shown in FIG. 2.

Ch. On: This field includes a flag indicating whether the RTS includes a channels list.

Channels List: This field includes a channels list including a list of channels that are available to a node sending the RTS frame. A node receiving the RTS frame may select one or more channels from the available channels and specify the chosen channels inside a CTS frame. In some examples, the channel list may include less than all channels that are available to a node. For example, if a Direct-Sequence Spread Spectrum (DSSS) modulation is employed, the channel list may be limited to 13 channels in the 915 MHz ISM band. The channel list may comprise, for example, a list of qualified channels between the node that sent the RTS and the node that received the RTS. The list of qualified channels may be maintained in memory of the node that sent the RTS and/or the node that received the RTS, such as in the FOM links data 228 maintained in memory 116 of node 102C described with reference to FIG. 2.

Data Rate (DR) parameters: This field indicates a maximum data rate and/or available data rates supported and/or proposed by a node sending the RTS frame. A node receiving the RTS frame may utilize this field to determine data rates of which both the sending and receiving nodes are capable, such as for exercising a node. The determined data rates may be sent to the sending node using a CTS frame. The determined data rates may be set to at most the maximum data rate of a slower of the two nodes. Thus, if the RTS proposes a data rate higher than the receiving node is capable of, the receiving node will set a lower data rate (at most the maximum data rate of the receiving node) when sending the CTS frame.

Data_ID: This field includes an ID of a data packet. This ID may be present inside the RTS frame. This field may be utilized if, for example, the data packet was received by a particular node but an acknowledgement was not received at a node which sent the data packet. In this case, the node which sent the data packet with Data_ID may assume that the data packet was not received and may resend an RTS frame for the same Data_ID. In some cases, when the particular node keeps track of a number of last Data_IDs received, the particular node may respond with an ACK frame instead of a CTS frame, thus avoiding a retransmission of the data frame.

F_ID: This field includes a MAC frame ID of the RTS frame. The intended destination of the RTS frame will copy this F_ID in the CTS frame answering to this RTS frame. When the node sending RTS frame receives a CTS frame, it may use the F_ID in CTS frame to determine if the CTS frame is the expected one (i.e., it was sent in answer to the RTS frame the node has sent previously).

NP: This field indicates a number of packets to be exchanged with a node receiving the RTS frame. This field tells the receiving node how many packets to listen for on a specified data channel before switching back to listen on the control channel. This field may also be useful in determining availability of particular channels.

Pre_Ch: This field indicates one or more channels that a node prefers to utilize for exchanging data frames, such as the test data frames. Nodes which are not involved in this exchange, but which overhear the RTS, may update their busy device lists (e.g., as described with reference to FIG. 2) based on this field. By default, the recipient of the RTS frame may select this channel for data exchange, if possible. However, if this channel is busy or is not a qualified channel of the link, the recipient node may designate a different channel in the CTS.

DIR: This field indicates whether traffic is from a root or is to be sent to the root. Traffic sent from a root toward a leaf is said to be "downstream," while all communications sent toward the root are said to be "upstream." The field may be set to 1 for upstream traffic and 0 for downstream traffic, for example.

FIG. 7, meanwhile, illustrates an example CTS message 700 for one or more communication technologies in the form of a frame that may be communicated to indicate that a node is available to receive data. The CTS frame 700 may include, for example, PHY parameters and one or more data channels selected by the first node. In some instances, the CTS frame is utilized to inform neighboring nodes that the node sending the RTS and the node sending the CTS will be unavailable and that the selected data channel will be busy during a specified time period. In the example of FIG. 7, the CTS frame includes the following fields: FC, sequence number, destination PAN identifier, destination address, source PAN identifier, source address, auxiliary security header, payload, and FCS. Details of the foregoing fields of the CTS frame other than the payload are well known to those skilled in the art and are not described in detail herein. The payload of the CTS frame, however, is customized to implement the routing techniques described above, as well as other functionalities. The payload of the CTS frame may be variable in size and may include, for example, one or more of the following fields:

Type: This field may indicate information similar to that described above in reference to FIG. 6. In the example of FIG. 7, this field indicates that the frame is a CTS frame.

HW: This field includes hardware parameters (e.g., type of device, version or generation of device, etc.) of a node that received the RTS frame (i.e., the node that will send the CTS frame).

Rank: This field is analogous to the corresponding field of the RTS frame, but as applied to the CTS frame. This field may be used in ranking links according to their relative quality in, for example, FOM links data 228, shown in FIG. 2.

DODAG_ID: This field is analogous to the corresponding field of the RTS frame, but as applied to the CTS frame. Specifically, this field is a DODAG identifier providing a choice for a node which receives the CTS frame to accept or reject by verifying routing consistency conditions at a MAC sub-layer.

Duration: This field is analogous to the corresponding field of the RTS frame, but as applied to the CTS frame, and may be used in determining availability and duration of availability, such as for maintaining the busy device list 230 of FIG. 2.

Channel: This field indicates a data channel selected by the node that received the RTS frame.

DR: This field indicates a data rate selected by the node that received the RTS frame. The data rate may be the same (if the receiving node is capable of the data rate) or different than the data rate specified in the RTS (if the receiving node is not capable of the data rate specified in the RTS). This data rate may be implemented to transfer data on a data channel, such as test data packets.

F_ID: This field includes a MAC frame ID of the CTS frame, which may be identical to the F_ID value of the RTS frame.

As discussed above, the RTS and CTS frames 600 and 700 are merely examples of some PDUs that may be used to implement the routing techniques described herein. In other embodiments various other PDUs may be employed to implement the described routing techniques.

Example Method of Determining Degradation of an Operational Link

FIG. 8 illustrates an example method 800 of determining a degradation of a link during communication of operational data. The method 800 is described with reference to the example architecture 100 of FIG. 1 for convenience. However, the method 800 is not limited to use with the example architecture 100 of FIG. 1 and may be implemented using other architectures and devices.

At operation 802, a node is communicating operational data with another node using a previously specified data rate and communication technology. At operation 804, a node obtains quality information regarding the link. The quality information may pertain to operational characteristics of the link as they pertain to the previously specified data rate and communication technology. In an embodiment, a node may use the operational data to measure a FOM of the link, such that the link quality information includes the measured FOM. Alternatively, a node may obtain signal strength information, bit error rate information, packet loss information, FOM information, or the like, as link quality information regarding the quality of the link.

At operation 806, a node may determine that the quality of the link has significantly degraded. For example, a node may compare the link quality information to a predetermined threshold to determine whether the quality of the link has significantly degraded. At operation 806, if it is determined that link quality has not significantly degraded, control will pass to operation 802. However, if it is determined that link quality has significantly degraded, control will pass to operation 808. At operation 808, a node may exercise the link to determine an FOM, as described herein, for various data rates and communication technologies available for the link. At operation 810, a node may select a data rate and communication technology using the determined FOM values. Control then passes to operation 802, where the nodes communicate using the newly selected data rate and communication technology.

CONCLUSION

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented at least in part by a node of a multi-channel network configured with computer-executable instructions, the method comprising:
    transmitting a request-to-send (RTS) message to a neighbor node, the RTS message designating channels for test;
    receiving a clear-to-send (CTS) message from the neighbor node which indicates that the neighbor node is available to receive transmissions;
    sending test data packets to the neighbor node according to the designated channels;
    receiving test data packets from the neighbor node according to the designated channels;
    computing a figure of merit (FOM) for communication links between the node and the neighbor node, wherein the FOM is based at least in part on the received test data packets, a received signal indicator (RSI), and a modulation used;
    employing a routing protocol to select a communication link from the communication links for routing a data packet to the neighbor node based in part on the FOM associated with the selected communication link and an identified communications technology; and
    transmitting the data packet to the neighbor node using the identified communication technology and an available data rate of the selected communication link.

2. The method of claim 1, wherein the multi-channel network includes nodes of a low power and lossy network (LLN).

3. The method of claim 1, further comprising sending a confirmation packet including a number of test data packets the node received from the neighbor node, the confirmation packet being usable by the neighbor node to evaluate link quality between the node and the neighbor node.

4. The method of claim 1, wherein each test data packet includes an indication of a cost in time of transmission through a respective link.

5. The method of claim 1, wherein computing the FOM comprises evaluating a transmission quality of multiple channels between the node and immediate neighboring nodes to determine whether a predetermined number of qualified links exist, wherein the predetermined number is less than a number of links the node has with the immediate neighboring nodes.

6. The method of claim 1, wherein computing the FOM comprises computing an expected transmission time (ETT) according to the following equation:

$$ETT = \frac{S}{B} \times ETX,$$

where $ETX = \frac{1}{1-P}$, $P = 1 - (1 - Pf) \times (1 - Pr),$

P is a loss rate on a link,
Pf is a probability that a data packet successfully arrives at the neighbor node,
Pr is a probability that a confirmation from the neighbor node is successfully received,
S is a packet size of the respective data packet, and
B is a bandwidth of the link between the node and the neighbor node.

7. The method of claim 1, further comprising:
sending an RTS message to another neighbor node, the RTS message designating channels to test;
receiving a CTS message from the another neighbor node, indicating that the another neighbor node is available to receive transmissions;
sending test data packets to the another neighbor node utilizing the designated channels to test;
receiving test data packets from the another neighbor node according to the sequence of channels to test; and
computing a link quality between the node and the another neighbor node based on the test data packets received from the another neighbor node.

8. The method of claim 7, further comprising repeating the acts of claim 7 until the node has identified a predetermined number of links satisfying a predetermined link quality threshold.

9. The method of claim 8, further comprising ranking neighbor nodes according to relative link quality of links between the node and the neighbor nodes.

10. The method of claim 9, further comprising routing communications from the node to one or more of the neighbor nodes based on the ranking.

11. The method of claim 1, wherein:
the RTS message comprises an indication that the node has a packet to transmit and will be unavailable for other transmissions for a period of time; and
the CTS message comprises an indication that the neighbor node will be unavailable for transmission for a period of time and that a designated transmission channel will be busy during the period of time.

12. One or more computer-readable media storing instructions that, when executed by one or more processors of a node, configure the node to perform the method of claim 1.

13. A network computing device of a multi-channel communication network comprising:
one or more processors;
memory communicatively coupled to the one or more processors;
a figure of merit (FOM) determination module, stored in the memory and executable on the one or more processors, to:

send a request-to-send (RTS) message to one or more neighbor nodes, the RTS message designating channels to test and data rates to test;
determine, based at least in part on a response to test data packets, a link quality of communication links between the network computing device and each of the one or more neighbor nodes; and
qualify one or more of the communication links between the network computing device and the one or more neighbor nodes that meet a predetermined threshold quality; and
a routing module, stored in the memory and executable on the one or more processors, to:
select a communication link from among the one or more qualified communication links for routing a data packet to a particular neighbor node based in part on qualification of the selected communication link using an identified communications technology; and
route transmissions via the selected communications link using the identified communication technology and an available data rate of the selected communication link.

14. The network computing device of claim 13, further comprising:
a multi-channel radio capable of sending and receiving communications on multiple different channels;
a busy device list module configured to determine availability of nodes and to maintain a listing of the nodes which are or will be busy and a duration that they will be busy; and
a metrology module stored in the memory and executable by the one or more processors to collect resource consumption data, the resource consumption data comprising at least one of electricity consumption data, water consumption data, or natural gas consumption data.

15. A method implemented at least in part by a node of a multi-channel network configured with computer-executable instructions, the method comprising:
sending a request-to-send (RTS) message to a neighbor node, the RTS message designating channels to test;
receiving a clear-to-send (CTS) message from the neighbor node, indicating that the neighbor node is available to receive transmissions;
sending test data packets to the neighbor node according to the channels to test;
receiving test data packets from the neighbor node according to the channels to test;
computing a figure of merit (FOM) for communication links between the node and the neighbor node, wherein the FOM is based at least in part on the received test data packets, a received signal indicator (RSI), and a modulation used;
qualifying one or more of the communication links between the node and the neighbor node based at least in part on the FOM and a predetermined threshold quality;
selecting a communication link, according to a routing protocol, from among the one or more qualified communication links for routing a data packet to a particular neighbor node based in part on qualification of the selected communication link using an identified communications technology; and
transmitting information based at least in part on the selected communications link.

16. The method of claim 15, further comprising sending a confirmation packet including a number of test data packets the node received from the neighbor node, the confirmation packet being usable by the neighbor node to evaluate the link quality between the node and the neighbor node.

17. The method of claim 15, wherein each test data packet includes an indication of a cost in time of transmission through a respective link.

18. The method of claim 15, wherein computing the FOM comprises computing an expected transmission time (ETT) according to the following equation:

$$ETT = \frac{S}{B} \times ETX,$$

where $ETX = \frac{1}{1-P}$, $P = 1 - (1 - Pf) \times (1 - Pr),$

P is a loss rate on a link,

Pf is a probability that a data packet successfully arrives at the neighbor node, Pr is a probability that a confirmation from the neighbor node is successfully received, S is a packet size of the respective data packet, and B is a bandwidth of the link between the node and the neighbor node.

19. The method of claim 15, further comprising:

sending a RTS message to another neighbor node, the RTS message designating channels to test;

receiving a CTS message from the another neighbor node, indicating that the another neighbor node is available to receive transmissions;

sending test data packets to the another neighbor node using the channels to test;

receiving test data packets from the another neighbor node using the channels to test; and computing a link quality between the node and the another neighbor node based on the received test data packets.

20. One or more computer-readable media storing instructions that, when executed by one or more processors of a node, configure the node to perform the method of claim 15.

* * * * *